United States Patent
Hoshino et al.

(10) Patent No.: US 8,303,120 B2
(45) Date of Patent: Nov. 6, 2012

(54) IMAGE DISPLAY APPARATUS AND IMAGE DISTORTION CORRECTION METHOD OF THE SAME

(75) Inventors: Hiroshi Hoshino, Hirakata (JP); Ryo Kawamura, Katsushika (JP); Atsuyuki Yamamoto, Sakai (JP)

(73) Assignee: Panasonic Corporation, Osaka (JP)

( * ) Notice: Subject to any disclaimer, the term of this patent is extended or adjusted under 35 U.S.C. 154(b) by 1169 days.

(21) Appl. No.: 12/159,125

(22) PCT Filed: Feb. 21, 2007

(86) PCT No.: PCT/JP2007/000109
§ 371 (c)(1),
(2), (4) Date: Jun. 25, 2008

(87) PCT Pub. No.: WO2007/097122
PCT Pub. Date: Aug. 30, 2007

(65) Prior Publication Data
US 2009/0268095 A1    Oct. 29, 2009

(30) Foreign Application Priority Data

Feb. 21, 2006 (JP) ................ P2006-044393
May 24, 2006 (JP) ................ P2006-144402
Jul. 7, 2006 (JP) ................ P2006-188543

(51) Int. Cl.
*G03B 21/14* (2006.01)

(52) U.S. Cl. ........ 353/79; 353/7; 353/8; 353/30; 353/31; 353/69; 353/70; 353/72; 353/101; 353/119; 353/122; 359/443; 359/446

(58) Field of Classification Search ......... 353/7, 8, 353/20, 30, 31, 69, 70, 72, 79, 101, 119, 353/122; 359/443–444, 446, 448, 449, 451, 359/458, 461; 348/E13.014, E13.022, E13.029, 348/E13.041, E13.044, E13.058, E13.059, 348/E13.07, E13.071; 349/5, 7, 8, 9, 96
See application file for complete search history.

(56) References Cited

U.S. PATENT DOCUMENTS
3,784,742 A * 1/1974 Burnham et al. ............. 348/123
(Continued)

FOREIGN PATENT DOCUMENTS
JP          200248711         5/2002
(Continued)

OTHER PUBLICATIONS
English language Abstract of JP 2002-148711, May 22, 2002.
(Continued)

*Primary Examiner* — Georgia Y Epps
*Assistant Examiner* — Sultan Chowdhury
(74) *Attorney, Agent, or Firm* — Greenblum & Bernstein, P.L.C.

(57) ABSTRACT

An image display apparatus includes a projector receiving an image signal and projecting image light and a screen including a projection plane of arbitrary shape. The projector and screen are connected with link mechanisms and link mechanisms. The relative position and posture between the projector and the screen are automatically or manually changeable. The relative position and posture between the projector and the screen are measured, and correction parameters for correcting distortion of image light projected from the projector onto the screen are calculated from the previously set viewing position of the viewer and the shape of the projection plane of the projector. Based on the calculated correction parameters, the image signal inputted into the projector is subjected to distortion correction processing. It is therefore possible to allow the viewer to see a clear image even if the position of the screen is changed.

23 Claims, 27 Drawing Sheets

U.S. PATENT DOCUMENTS

| | | | |
|---|---|---|---|
| 5,463,434 A * | 10/1995 | Kanayama et al. | 353/94 |
| 5,500,692 A * | 3/1996 | Onozuka | 348/759 |
| 5,678,910 A * | 10/1997 | Martin | 353/7 |
| 5,836,664 A * | 11/1998 | Conner et al. | 353/70 |
| 6,231,189 B1 * | 5/2001 | Colucci et al. | 353/20 |
| 7,130,119 B2 * | 10/2006 | Takahashi et al. | 359/462 |
| 7,236,278 B2 * | 6/2007 | Togino | 359/15 |
| 7,270,421 B2 * | 9/2007 | Shinozaki | 353/69 |
| 7,692,605 B2 * | 4/2010 | Tsao | 345/6 |
| 7,980,702 B2 * | 7/2011 | Hoshino et al. | 353/69 |
| 2001/0017687 A1 | 8/2001 | Rodriguez, Jr. et al. | |
| 2002/0131024 A1 | 9/2002 | Keenan et al. | |
| 2005/0122484 A1 * | 6/2005 | Rodriguez et al. | 353/79 |

FOREIGN PATENT DOCUMENTS

JP  3387487  3/2003

OTHER PUBLICATIONS

Shibano et al., "CyberDome: PC Clustered Hemi Spherical Immersive Projection Display", ICAT 2003, Dec. 5, 2003, XP002437177.

Shibano et al., "CyderDome: PC Clustered Hemi Spherical Immersive Projection Display", ICAT, Cyberspace R&D Group, Japan, Dec. 5, 2003, pp. 1-7.

* cited by examiner

FIG. 27
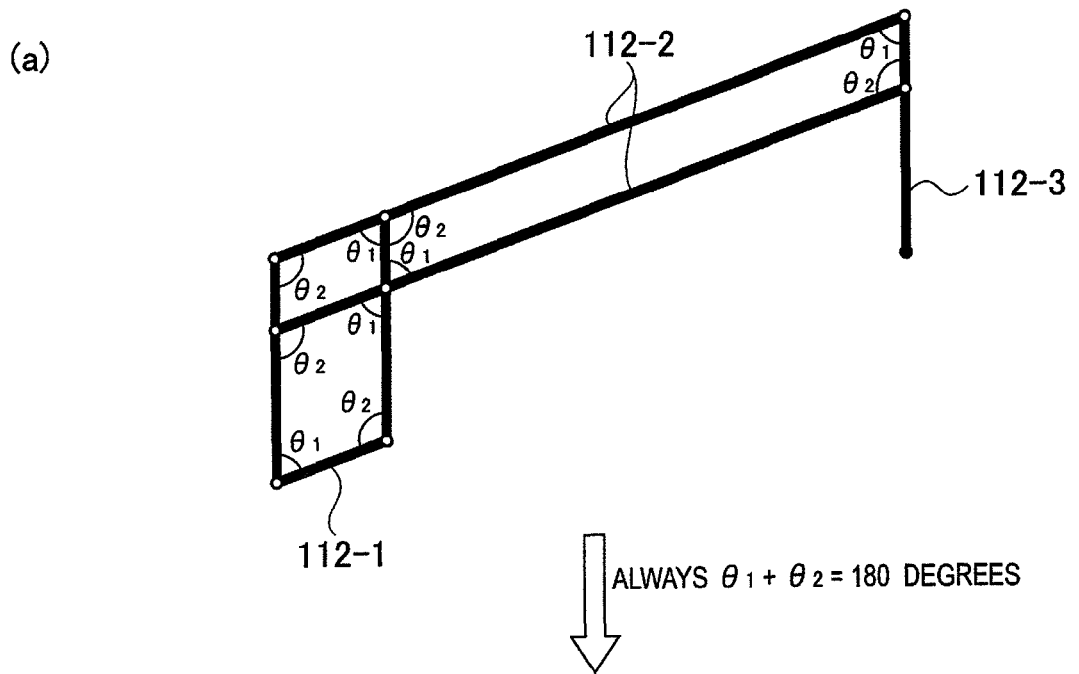
(a)
ALWAYS $\theta_1 + \theta_2 = 180$ DEGREES
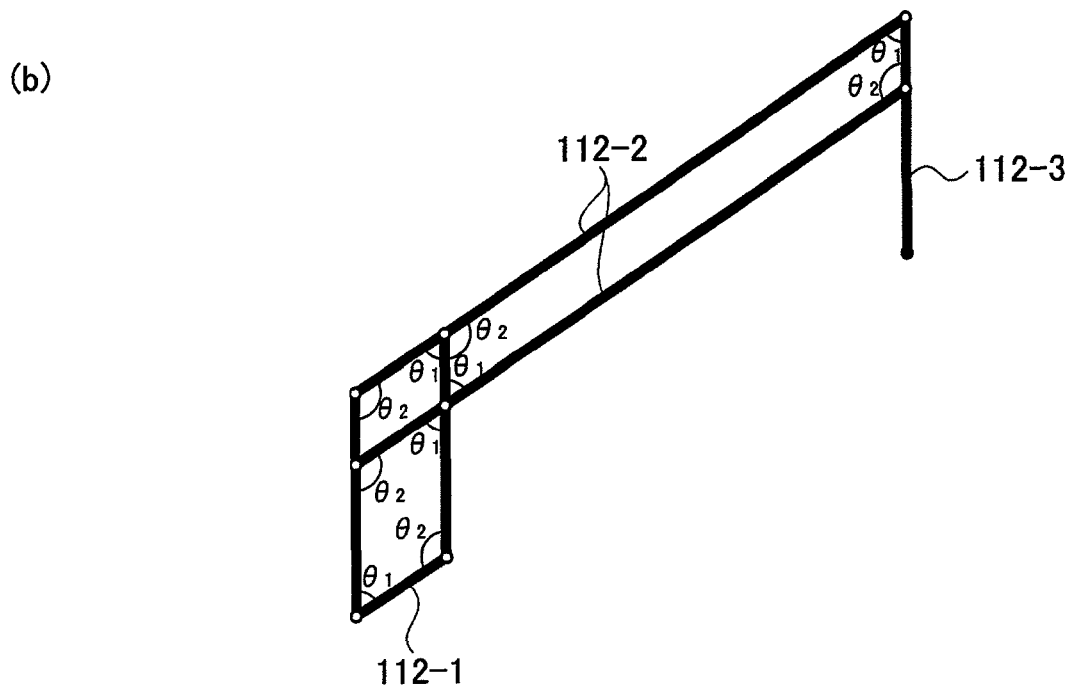
(b)

FIG. 32
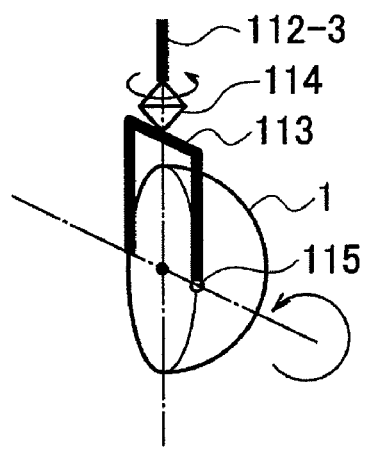
FIG. 33
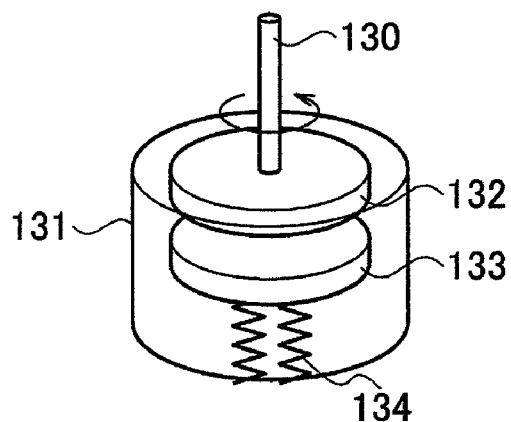
FIG. 34
(a) 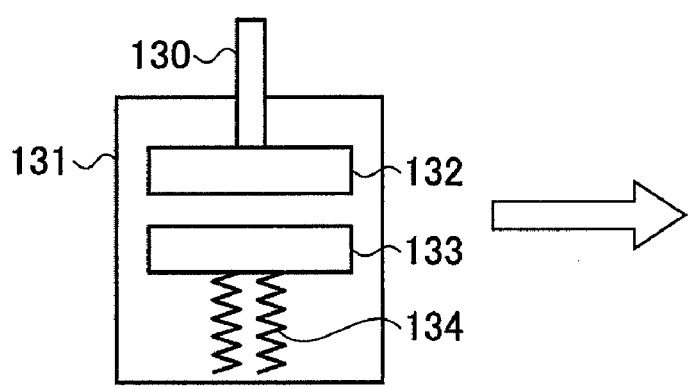 (b) 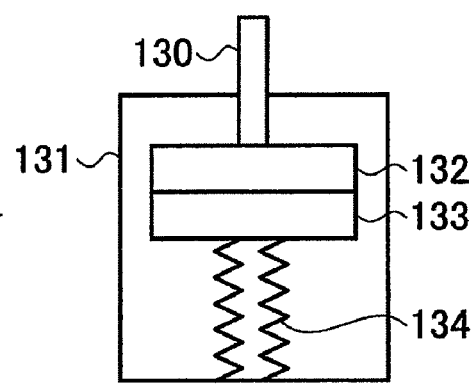

IMAGE DISPLAY APPARATUS AND IMAGE DISTORTION CORRECTION METHOD OF THE SAME

TECHNICAL FIELD

The present invention relates to an image display apparatus projecting an image onto a screen and creating a feeling of realizing the image in order to provide a viewer with realistic image space and to an image distortion correction method of the same.

BACKGROUND ART

As a technique to allow a viewer to simulate various experiences, the technique described in the literature has been known.

Such virtual reality systems provide an image covering the human's field of view to give an immersive feeling in the image since information obtained by visual sense occupies the largest part of information obtained by human senses and is 80 to 85% of information obtained from all the human senses. Also in virtual reality, providing information to the visual sense is the most important factor to create a more real virtual space. There has been a demand for an image providing technology to not only provide an image but also realize a more natural view such as a wide field of view, a stereoscopic view, and a view of life-size scale.

Such virtual reality creating systems include a system projecting a wide-view image without distortion onto a hemispherical screen which surrounds the viewer like the following patent literature.

Japanese Patent No. 3387487

DISCLOSURE OF INVENTION

Technical Problem

Meanwhile, in the aforementioned virtual reality creating system, although the viewer wants to observe an image at a free screen position, the screen is fixed in the structure described in the Patent Literature, and the position of the same is not arbitrarily changed.

The present invention was proposed in the light of the aforementioned current circumstances, and an object thereof is to provide an image display apparatus capable of allowing a viewer to see a clear image even if the screen position is changed and provide an image distortion correction method of the image display apparatus.

Technical Solution

An image display apparatus according to the present invention includes: an image projection unit receiving an image signal and projecting image light; and an image display unit including a projection plane of arbitrary shape, onto which the image light from the image projection unit is projected. In order to solve the aforementioned problems, the image display apparatus includes: a connection unit including a plurality of arms which connect the image projection unit and the image display unit and a link mechanism which allows relative position and posture between the image projection unit and the image display unit to manually or automatically change; a measurement unit measuring the relative position and posture between the image projection unit and the image display unit; and an image signal processing unit which calculates correction parameters for correction of distortion of the image light projected from the image projection unit onto the image display unit based on the relative position and posture measured by the measuring unit, a previously set viewing position of a viewer, the shape of the projection plane of the image display unit, and an angle of field of the image light projected from the image projection unit, and shift amount which is difference between point at the intersection of a virtual projection plane vertical to the direction of a previously set optical axis of the image projecting unit with the optical axis and center point of projected image on the virtual projection plane and performs distortion correction processing for the image signal inputted into the image projection unit based on the calculated correction parameters.

In order to correct distortion of an image of an image display apparatus including an image projection unit receiving an image signal and projecting image light; an image display unit including a projection plane of arbitrary shape, onto which the image light from the image projection unit is projected; a connection unit including a plurality of arms which connect the image projection unit and the image display unit and a link mechanism which allows relative position and posture between the image projection unit and the image display unit to manually or automatically change; and a measurement unit measuring the relative position and posture between the image projection unit and the image display unit, an image distortion correction method for an image display apparatus according to the present invention: calculates correction parameters for correcting distortion of the image light projected from the image projection unit onto the image display unit based on the relative position and posture measured by the measurement unit, the previously set viewing position of the viewer, the shape of the projection plane of the image display unit, and an angle of field of the image light projected from the image projection unit, and shift amount which is difference between point at the intersection of a virtual projection plane vertical to the direction of a previously set optical axis of the image projecting unit with the optical axis and center point of projected image on the virtual projection plane; and performs distortion correction processing for the image signal inputted into the image projection unit based on the correction parameters.

Advantageous Effects

With the image display apparatus according to the present invention and the image distortion correction method for the image display apparatus, it is possible to measure the relative position and posture between the image display unit and the image projection unit and automatically perform the distortion correction processing for the image signal even when the image display apparatus has a structure in which the image display unit and the image projection unit are connected with the connection unit capable of changing the relative position and posture thereof, thus making it possible to display an image without distortion by the image display unit. Accordingly, processing to prevent distortion of an image seen by the viewer can be implemented according to a change of the position of the image display unit.

BRIEF DESCRIPTION OF THE DRAWINGS

FIG. 27 is an explanatory view showing a state variation of the connection mechanism configured to direct the optical axis of the image light to the predetermined position of the screen.

FIG. 32 is a perspective view showing a structure of a connection mechanism configured to arbitrarily change the posture of the projection plane of the screen.

FIG. 33 is a perspective view showing a structure of a stopper mechanism locking rotation of an arm joint point.

FIG. 34 is an explanatory view explaining an operation of the stopper mechanism.

Explanation of Reference

| | |
|---|---|
| 1 | SCREEN (IMAGE DISPLAY SECTION) |
| 2 | PROJECTOR (IMAGE PROJECTION SECTION) |
| 3 | CONNECTION MECHANISM |
| 5 | DISTANCE SENSOR |
| 6 | POINT-OF-VIEW MONITORING SECTION |
| 7 | INFORMING FUNCTION SECTION |
| 11 | SENSOR SECTION |
| 12 | IMAGE SIGNAL PROCESSING SECTION |
| 22 | CORRECTION PROCESSING SECTION |
| 21 | IMAGE GENERATING SECTION |
| 24 | COORDINATE CALCULATION SECTION |
| 23 | CORRECTION PARAMETER CALCULATION SECTION |
| 31 | DRIVE PARAMETER CALCULATION SECTION |
| 41 | PROJECTOR DRIVE MECHANISM |

-continued

| | Explanation of Reference |
|---|---|
| 51 | SCREEN DRIVE MECHANISM |
| 52 | CAMERA (CONDITION DETECTING MECHANISM) |
| 61 | IMAGE PROCESSING SECTION |
| 62 | CORRESPONDENCE TABLE STORAGE SECTION |
| 63 | SCREEN DRIVE POSITION CALCULATION SECTION |
| 64 | PROJECTOR DRIVE POSITION CALCULATION SECTION |
| 65 | PROJECTION RANGE CALCULATION SECTION |
| 71 | OPTICAL SENSOR |
| 81 | OPTICAL SENSOR SIGNAL PROCESSING SECTION |
| 82 | CORRESPONDENCE TABLE STORAGE SECTION |
| 83 | DRIVE POSITION CALCULATION SECTION |
| 92 | ROTARY ACTUATOR |
| 91 | MIRROR |
| 100 | GLASSES |
| 101 | POSITIONAL SENSOR |
| 130 | ROTARY SHAFT |
| 140 | COUNTERBALANCE SECTION |

BEST MODE FOR CARRYING OUT THE INVENTION

Hereinafter, a description is given of embodiments of the present invention with reference to the drawings.

Figure 1:
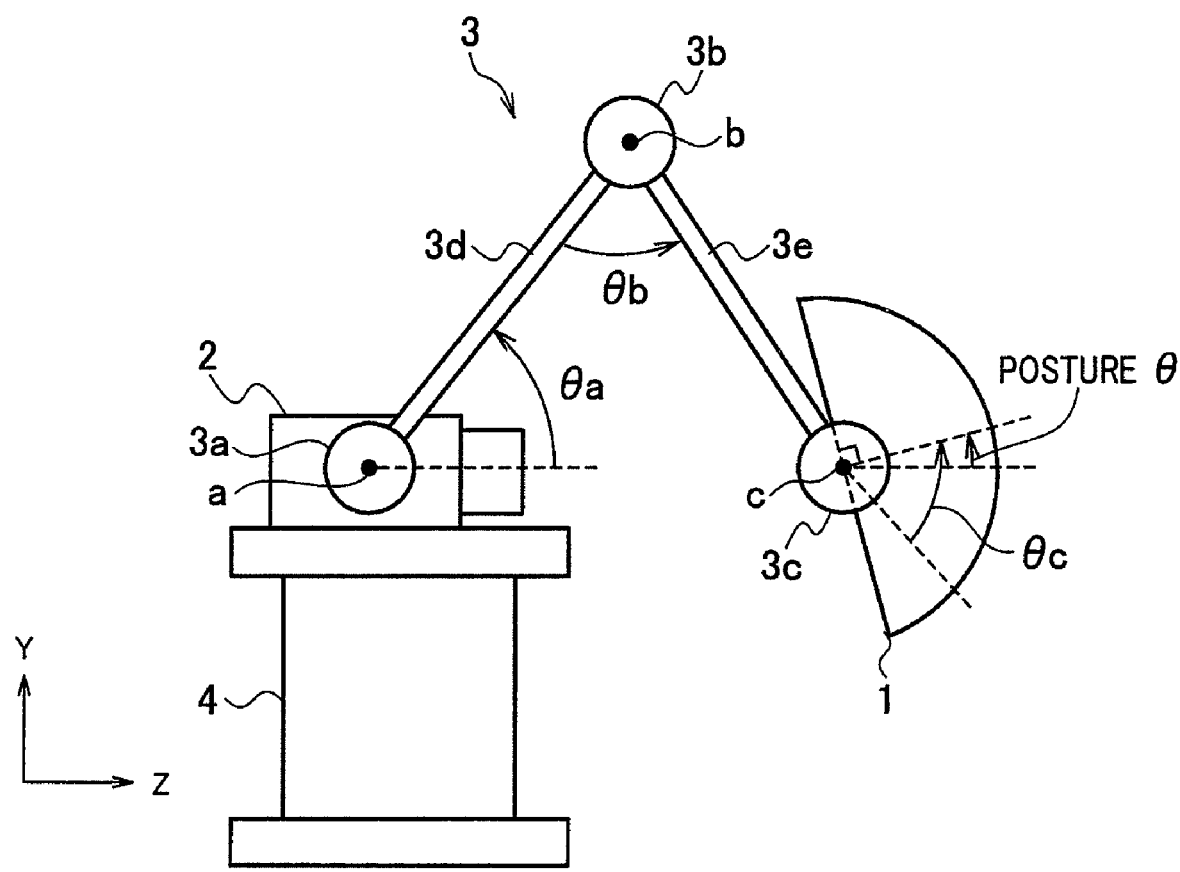
FIG. 1 is a side view showing a structure of an image display apparatus to which the present invention is applied.
Figure 2:
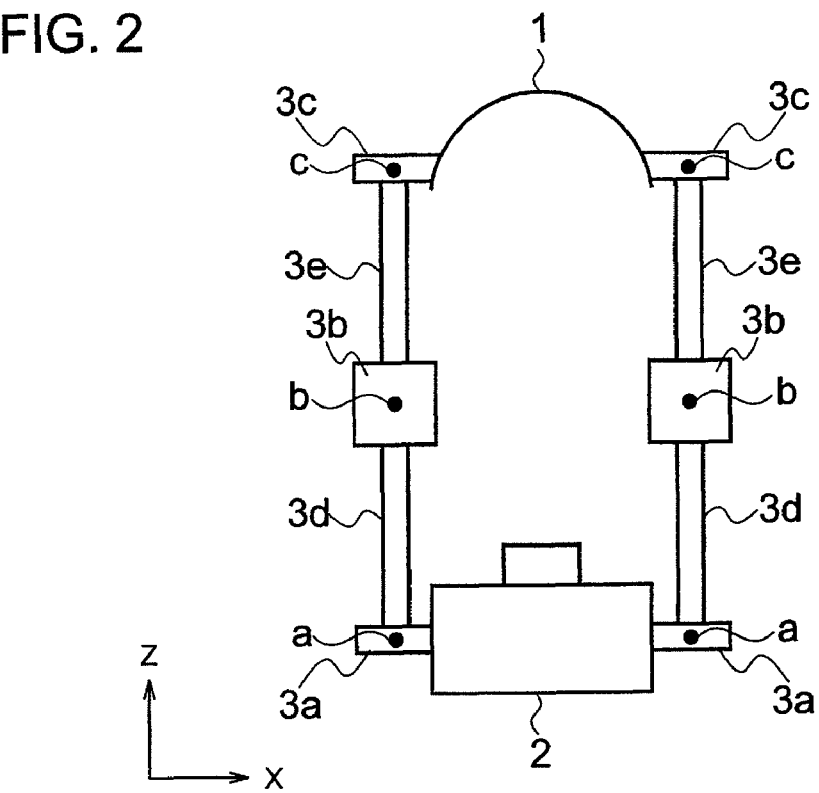
FIG. 2 is a top view showing the structure of the image display apparatus to which the present invention is applied.

As shown in a side view of FIG. 1 and a top view of FIG. 2, an image display apparatus which the present invention is applied to projects image light from a projector 2 as an image projection unit according to an image signal subjected to distortion correction processing in order to display image light without distortion on a screen 1 as an image display unit including a projection plane of arbitrary shape with a concave surface faced to a viewer.

In the following examples, a description is given of cases where a non-stereoscopic image is projected from the projector 2 to the screen 1. However, a stereoscopic image may be displayed on the screen 1. In this case, the image display apparatus causes a user to wear polarized glasses of which right and left eye glasses transmit image light rays with different polarization directions and alternately projects from the projector 2 in a polarization method several types of image light rays which provide a parallax therebetween and have different polarization directions. Alternatively, the image display apparatus causes a user to wear liquid-crystal shutter glasses and projects from the projector 2 in a time division method image light rays of which provide a parallax therebetween. In the case of displaying a stereoscopic image on the screen 1 in the polarization method, the screen 1 is made of a material preserving the polarization directions of image light, and right and left eye image light rays with different polarization directions are projected from two light projecting windows of the projector 2. In the case of displaying a stereoscopic image on the screen 1 in the time-division method, the right and left eye image light rays are alternately projected from a single light projecting window in a time division manner, and projection of the right and left image light rays is synchronized with switching of right and left shutters of liquid crystal shutter glasses.

Moreover, as the screen 1 on which a stereoscopic image is projected, in the case of the polarization method, a so-called silver screen with aluminum powder or the like applied on a surface of a projection plane is used. Furthermore, the shape of the screen 1 may be not only a hemispherical dome shown in FIG. 1 or in the followings but also may be a planar screen, a quadric screen using a part of a cylinder, or a screen composed of various combinations of the hemispherical dome screen, planar screen, and quadric screen. Even in the cases of the screen 1 of such various shapes, the image display apparatus performs image distortion correction processing according to each shape.

In this image display apparatus, the projector 2 is placed on a mounting table 4. The image display apparatus includes a connection mechanism 3 which connects the projector 2 and the screen 1 with link mechanisms 3a, 3b, and 3c at three places and two arms 3d and 3e. In the image display apparatus shown in FIG. 2, the two link mechanisms 3a, 3a are provided at positions a, a in both ends of the projector 2 in a X-axis direction; the two link mechanisms 3c, 3c are provided at positions c, c, which are substantially at the center of the screen 1 in a Y-axis (vertical) direction in side edge portions in the X-axis (lateral) direction; and the two link mechanisms 3b, 3b are provided at arm joint points b, b between arms 3d, 3d and the arms 3e, 3e. This connection mechanism 3 can automatically or manually change relative position and posture between the screen 1 and the projector 2.

In the image display apparatus shown in FIGS. 1 and 2, the connection mechanism 3 is shown which changes the relative position and posture between the screen 1 and the projector 2 in the Y-axis and Z-axis (longitudinal) directions, but the connection mechanism 3 may also change the relative position and posture in the X-axis direction. The image display apparatus in FIG. 1 shows the case where the projector 2 is placed on the remounting table 4. The remounting table 4 may include casters on the bottom face so as to be movable. Moreover, the relative position and posture between the screen 1 and the projector 2 may be configured to be changeable by the casters.

The link mechanisms 3a to 3c of the connection mechanism 3 are configured to individually incorporate angle sensors which acquire angle information for measurement of the relative position and posture between the projector 2 and the screen 1. As shown in FIG. 1, the angle sensor incorporated in the link mechanism 3a measures an angle theta a between an optical axis of the projector 2 and the arm 3d; the angle sensor incorporated in the link mechanism 3b measures an angle theta b between the arm 3d and the arm 3e at the point b; and the angle sensor incorporated in the link mechanism 3c measures an angle theta c between a radial direction of the hemispherical screen 1 and the arm 3e.

Figure 3:
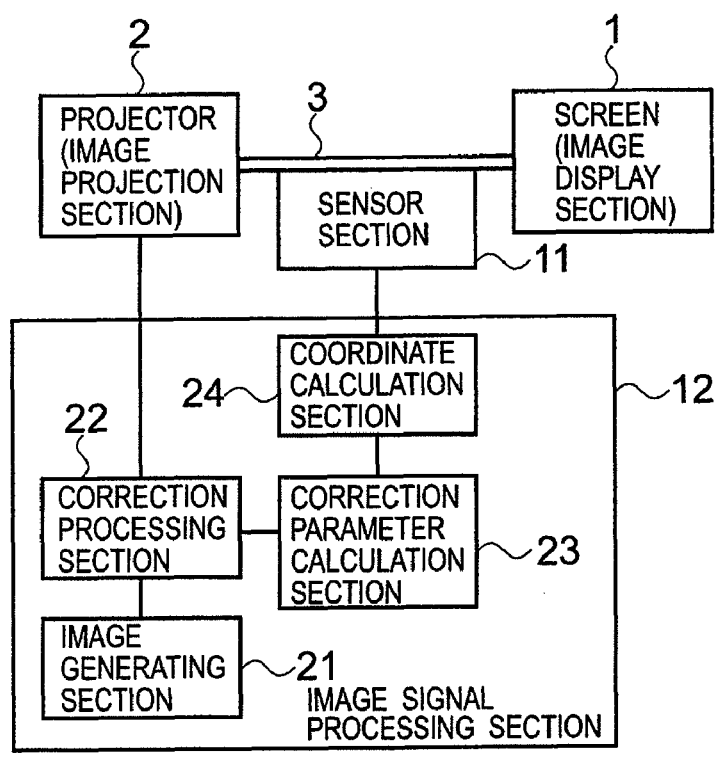
FIG. 3 is a block diagram showing a functional structure of the image display apparatus to which the present invention is applied.

In such an image display apparatus, whose functional structure is shown in FIG. 3, the projector 2 and screen 1 are connected by the connection mechanism 3, and the three angle sensors incorporated in the link mechanisms 3a to 3c of the connection mechanism 3 constitute a sensor section 11. Arrows shown in FIG. 1 indicate positive directions of an angle theta and the angles theta a, theta b, and theta c.

The angles theta a to theta c detected by the sensor section 11 are read by the image signal processing section 12. The image signal processing section 12 is composed of, for example, a personal computer and the like and includes an image generating section (IMAGE CREATING SECTION) 21, a correction processing section 22, a correction parameter calculation section 23, and a coordinate calculation section 24, which is connected to the sensor section 11.

The coordinate calculation section 24 receives the angles theta a to theta c measured by the sensor section 11 and calculates a relative position c (Xs, Ys, Zs) of the screen 1 with the position a (Xp, Yp, Zp) of the projector 2 being set to the origin based on current values of the angles theta a to theta c and previously stored lengths La and Lb of the arms 3d and 3e of the connection mechanism 3. The coordinate calculation section 24 calculates the relative posture between the screen 1 and the projector 2 which is a rotation angle of the screen 1 with respect to the optical axis direction of the projector 2.

The coordinate calculation section 24, for example, calculates Z-axis and Y-axis direction positions Zs and Ys of the screen 1 relative to the origin (Xp, Yp, Zp) of the projector 2 using the following arithmetic expressions:

$$Zs = La\ \cos(\text{theta } a) - Lb\ \cos((\text{theta } a) + (\text{theta } b))$$

$$Ys = La\ \sin(\text{theta } a) - Lb\ \sin((\text{theta } a) + (\text{theta } b))$$

The coordinate calculation section 24 also calculates the relative posture theta which is a relative angle between the optical axis of the projector 2 and the projection plane of the screen 1 using the following arithmetic expression:

$$\text{posture theta} = \text{theta } a + \text{theta } b + \text{theta } c - 180$$

The coordinate calculation section 24 judges based on the relative position and distance between the screen 1 and the projector 2 and the angle of field of the projector 2 whether the screen 1 is located outside a projection range of the projector 2. When image light from the projector 2 is not projected onto the screen 1, the coordinate calculation section 24 judges that the screen 1 does not exist and stops projection of the image light.

Desirably, the coordinate calculation section 24 calculates the distance between the screen 1 and the projector 2; notifies the projector 2 of the degree of expansion or condensation of image light; and then controls a zoom and/or focus mechanism of the projector 2. This allows image light to be projected onto the entire surface of the screen 1.

The correction parameter calculation section 23 receives the previously set position of the viewer of an image, the shape of the projection plane of the screen 1, the relative position and posture received from the coordinate calculation section 24, a current value of the angle of field of the projector 2, and shift amount which is difference between the point at the intersection of a virtual projection plane vertical to the direction of a previously set optical axis of the projector 2 with the optical axis and center point of projected image on the virtual projection plane. The correction parameter calculation section 23 creates a distortion correction table as correction parameters for correcting distortion when the image signal is projected onto the screen 1.

Figure 4:
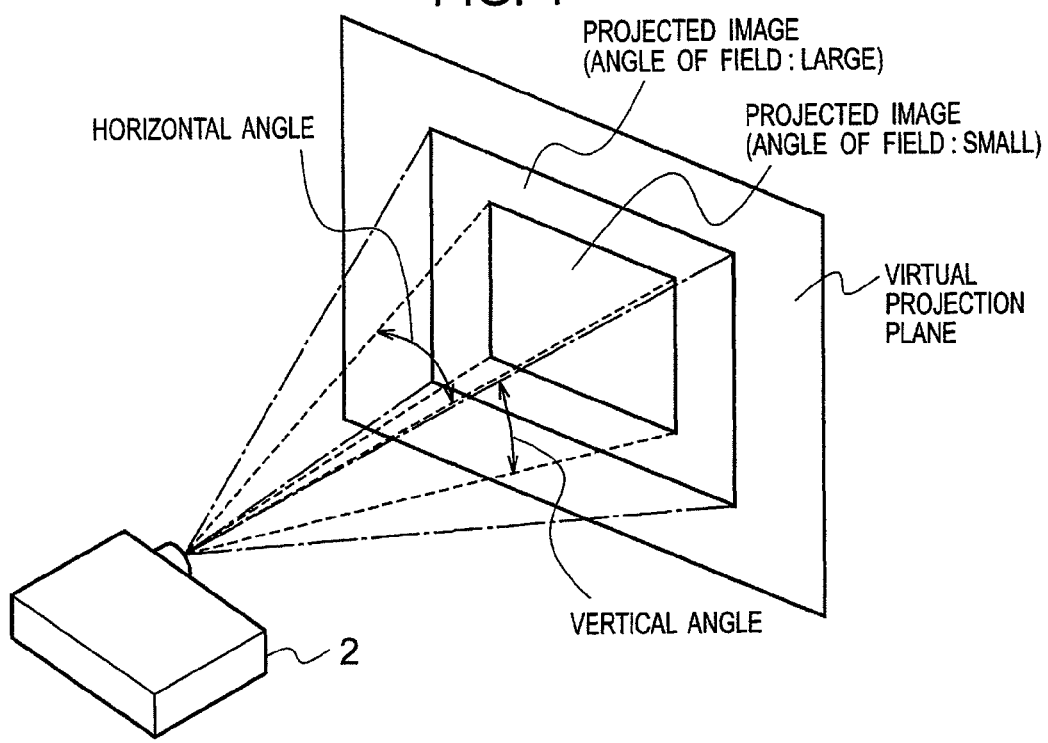
FIG. 4 is a perspective view showing an angle of field of the image display apparatus to which the present invention is applied.

As shown in FIG. 4, the angle of field of projector 2 is a value indicating an image projection range of the image light projected onto the virtual projection plane projected from projector 2. This virtual projection plane is a plane vertically located the optical axis of projector 2. The angle of field of the projector 2 is vertical angle of field and horizontal angle of field. This angle of field of the projector 2 is ratio of distance between position of projector 2 and the virtual projection plane to height or width of image projected on the virtual projection plane. Generally, the angle of field of the projector 2 is expressed in the angle that is arctangent of the ratio. The correction parameter calculation section 23 may input the ratio based on the width of image or the ratio based on the height of image as the correction parameters.

Figure 5:
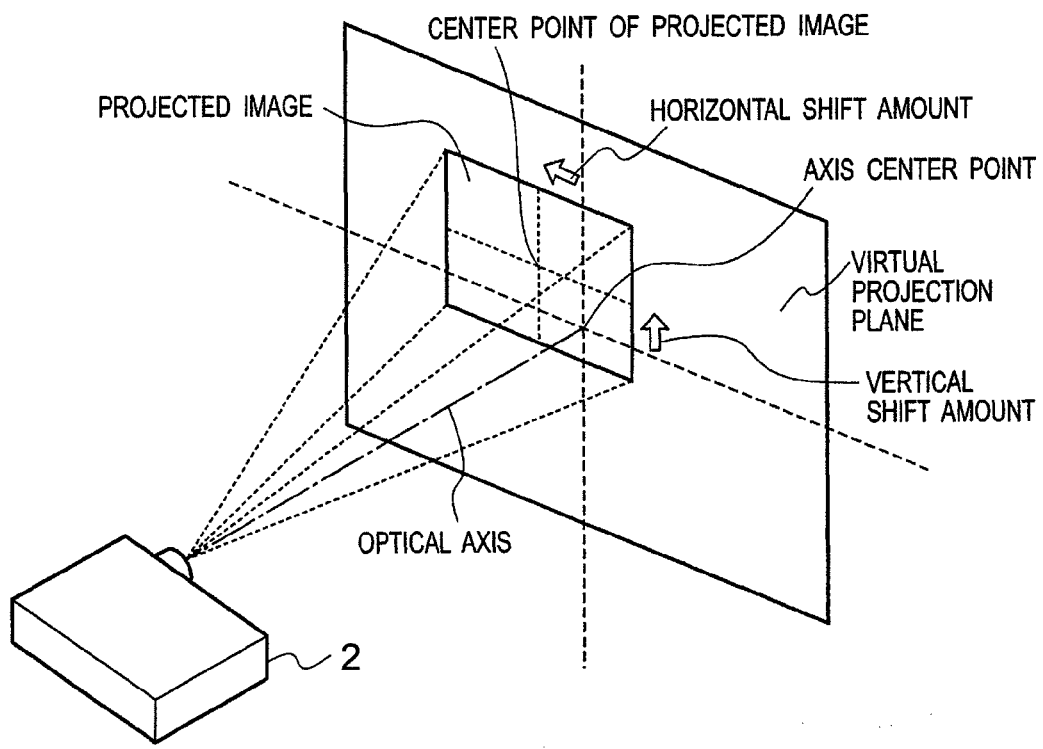
FIG. 5 is perspective view showing a shift amount of the image display apparatus to which the present invention is applied.
Figure 6:
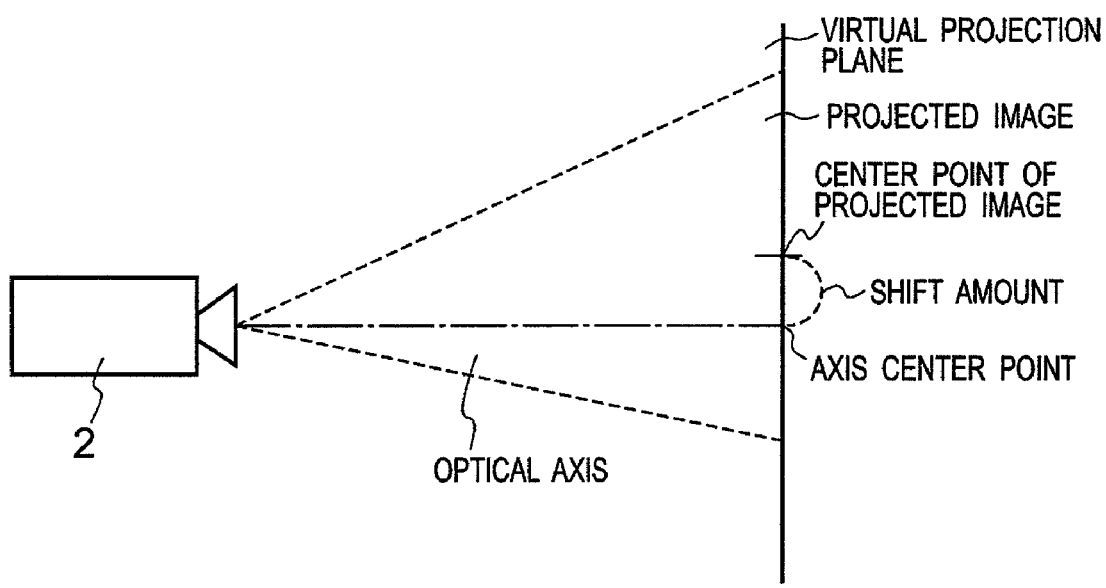
FIG. 6 is side view showing a shift amount of the image display apparatus to which the present invention is applied.

As shown in FIG. 4 and FIG. 5, the shift amount includes the vertical shift amount and the horizontal one which express the distance from the axis center point to the center point of the projected image in a vertical and horizontal direction respectively. FIG. 5 shows the vertical shift amount and the horizontal shift amount, FIG. 6 only shows the vertical shift amount. The more difference from the axis of the image projected onto the screen 1 is large, the more the shift amount is large. The distance from the axis to the center point of the projected image on the screen 1 varies according to the ratio of the distance between the projector 2 and the virtual projection plane to the shift amount. Thus, the correction parameter calculation section 23 may input the ratio as the correction parameters. The image light position and range projected on the screen 1 by projector 2 depend on the image of field of the projector and the shift amount when the relative position and posture between the projector 2 and the screen 1 and the shape of the projection plane of the screen 1 are known.

This distortion correction table is a correspondence map between the planar projection plane and a mesh model of the projection plane of arbitrary shape of the screen 1, according to which coordinate transformation is performed. Specifically, the distortion correction table is used to transform the image signal for display on the planar projection plane into an output image signal for display on the projection plane of arbitrary shape on a pixel basis.

The image generating section 21 creates a planar image signal for projecting an image onto a plane and outputs the same to the correction processing section 22. Upon receiving the planar image signal from the image generating section 21, according to the correction parameters calculated by the correction parameter calculation section 23, the correction processing section 22 performs distortion correction processing to allow the viewer to see an image without distortion from the viewer's position even when the planar image signal is projected onto the projection plane of the screen 1. The correction processing section 22 transforms the planar image signal into the output image signal for display on the projection plane of arbitrary shape on a pixel basis to create the output image signal and then supplies the same to the projector 2. Thus, image light subjected to distortion correction according to the relative position and posture between the screen 1 and the projector 2 is projected onto the screen 1 by the projector 2.

As described above, with the image display apparatus to which the present invention is applied, even when the screen 1 and projector 2 are connected by the connection mechanism 3, the image signal can be automatically subjected to the distortion correction processing by measuring the relative position and posture between the screen 1 and the projector 2, thus making it possible to display an image without distortion on the screen 1. Moreover, with the image display apparatus, by displaying a stereoscopic image on the screen 1, it is possible to display an immersive image allowing the viewer to easily recognize the depth.

Moreover, with the image display apparatus to which the present invention is applied, even when the position of the screen 1 is changed because of an obstacle or the like located between the screen 1 and the projector 2, by again performing the distortion correction processing based on new values of the relative position and posture between the screen 1 and the projector 2, a clear and immersive image without distortion can be displayed on the screen 1 without being affected by a shadow of the obstacle and the like. For example, when the viewer is a doctor, the positions of the screen 1 and projector 2 can be arranged by driving the connection mechanism 3 so that a bed, gauges, lighting equipment, and the like are located between the screen 1 and the projector 2 in an operation room. Accordingly, even in a small space like an operation room, it is possible to project an image of a diseased site of a patient and allow the operator to conduct an operation while seeing the clear image without distortion.

Furthermore, the image display apparatus explained with reference to FIGS. 1 to 3 may include in the image signal processing section 12 a speech recognition function to recognize the viewer's speech or an operation input function to detect an operation of the viewer and may further include a unit to input an instruction to change the position and posture of the screen 1 based on the viewer's speech or operation.

When the instruction from the viewer is inputted, the connection mechanism 3 changes the position and posture of the screen 1 according to the instruction so as to change the relative position and posture between the screen 1 and the projector 2. The coordinate calculation section 24 and correction parameter calculation section 23 of the image signal processing section 12 updates the correction parameters according to the change in the position and posture of the screen 1, thus allowing the viewer to see an image without distortion with the screen 1 being located at a position according to the viewer's intent.

Moreover, after the relative position and posture between the screen 1 and the projector 2 are changed according to the instruction from the viewer, desirably, the link mechanisms 3a to 3c include lock mechanisms to fix the changed relative position and posture between the screen 1 and the projector 2. The position of the screen 1 can be therefore fixed surely after the relative position and posture between the screen 1 and the projector 2 is changed by the instruction of the viewer.

After fixing the relative position and posture between the screen 1 and the projector 2 in such a manner, the image display apparatus previously sets the viewer's viewing position for the fixed relative position and posture between the screen 1 and the projector 2 and monitors the viewer's viewing position. When the monitored viewing position of the viewer is deviated from the previously set viewing position, the image display apparatus may inform the viewer. In other words, this image display apparatus informs that the image being displayed on the screen 1 cannot be observed from the viewer in a proper condition when the viewer's viewing point is deviated from the proper position after the relative position and posture between the screen 1 and the projector 2 are fixed.

Figure 7:
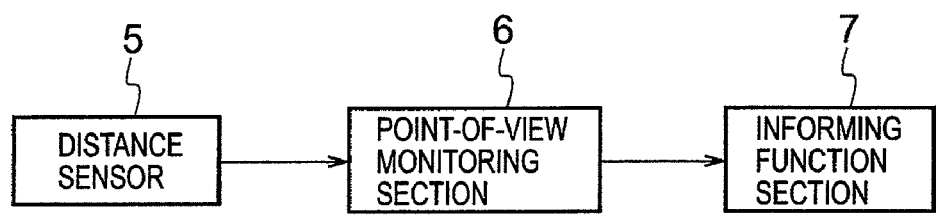
FIG. 7 is a block diagram showing a structure to monitor and indicate a viewing position of a viewer in the image display apparatus to which the present invention is applied.

As shown in FIG. 7, this image display apparatus includes, in addition to the structure shown in FIGS. 1 and 2, a distance measuring sensor 5 and a viewing position monitoring section 6 as a point-of-view monitoring unit to monitor the viewer's viewing position and an informing function section 7 as an informing unit.

The distance measuring sensor 5 is, for example, a distance sensor attached to the screen 1. Examples of this distance measuring sensor 5 are: a sensor measuring the distance by projecting infrared light and receiving the light reflected on a light reflector attached to a predetermined article worn by the viewer, for example, such as operator's hat, mask, or stereoscopic polarized glasses in the case of use during an endoscopic surgery in an operation room; and a sensor measuring the distance based on an image and capturing a measurement object with an image pickup device, for example, operator's eyebrows. The distance measured by the distance measuring sensor 5 is supplied to the viewing position monitoring section 6 as information of the viewer's viewing position. Moreover, the distance measuring sensor 5 may detect, for example, a position of a pedestal on which the viewer stands as well as the positions of the articles worn by the viewer (operator). In other words, the object to be detected indicating the viewer's viewing position only needs to be an article which moves as the viewer's viewing position changes, such as an article worn by the viewer or the pedestal on which the viewer stands.

The viewing position monitoring section 6 calculates the distance between the viewer's viewing position and the screen 1 from the distance measured by the distance measuring sensor 5 and monitors whether the calculated distance is changed from the distance between the previously stored viewing position and the screen by an allowable range or more. When the viewing position monitoring section 6 detects that the viewer's position is deviated from the previously determined viewing position, the informing function section 7 is driven.

In terms of the viewer's viewing position previously set in the viewing position monitoring section 6, in a state where the relative position and posture between the screen 1 and the projector 2 are fixed, a best viewer's viewing position for such a fixed state may be calculated by the viewing position monitoring section 6 as a recommended viewer's standing position (viewing position) based on the relative position c (Xs, Ys, Zs) of the screen 1 with the position a (Xp, Yp, Zp) of the projector 2 being set to the origin and the relative posture between the screen 1 and the projector 2 which is the rotation angle of the projector 2 with respect to the optical axis direction of the projector 2. Herein, the position a (Xp, Yp, Zp) is calculated by the coordinate calculation section 24 of the image signal processing section 12.

The informing function section 7 informs that the viewer's viewing position is deviated from the previously set viewing position according to the control signal from the viewing position monitoring section 6. The informing function section 7 is a sound output unit outputting sound to the viewer when the viewer's viewing position is deviated from the previously set viewing position; the projector 2 changing color of image light when the viewer's viewing position is deviated from the previously set viewing position; and a light emitting unit projecting light to the viewer when the viewer's viewing position is deviated from the previously set viewing position.

The informing function section 7 may be configured to be supplied with a signal indicating an amount (distance) by which the viewer's viewing position is deviated from the previously set viewing position and vary informing level or way according the amount of deviation.

For example, when the informing function section 7 is the sound output unit, the larger the amount by which the viewer's viewing position is deviated from the previously set viewing position is, the higher pitch sound (higher frequency sound) is generated to inform the viewer by the sound how much the viewer's viewing position is deviated. Moreover, the informing level or way may be changed according the direction in which the viewer's viewing position is deviated from the previously set viewing position.

For example, when the informing function section 7 is the light projection unit, according to the amount and direction that the viewer's viewing position is deviated from the previously set viewing position, intensity, blinking frequency, and color of emitted light may be varied. This makes it possible to inform how much the viewer's viewing position is deviated from the previously set viewing position and to simultaneously inform the direction of the deviation.

Furthermore, when the projector 2 is used as the informing function section 7 when the viewer's viewing position is deviated from the previously set viewing position, the color of the image light projected from the projector 2 toward the screen 1 may be varied. For example, the image signal processing section 12 is configured to include a signal processing function to generate parameters for changing color density and tone in the planar image signal which is created by the image generating section 21 upon receiving an output from the viewing position monitoring section. The color density and tone of the image supplied from the image generating section 21 to the correction processing section 22 are thereby changed to simultaneously inform that the viewer's viewing position is deviated from the previously set viewing position and the mount (distance) and direction of the deviation.

Next, a description is given of another structure example of the image display apparatus to which the present invention is applied. In the following description, the same structures and operations as those of the image display apparatus described above are given same reference numerals, and detailed descriptions thereof are omitted. However, it is obvious that the aforementioned structures are applicable to the following image display apparatus.

First, a description is given of a structure capable of arbitrarily changing the position of the projector 2 in the image display apparatus which the present invention is applied to with reference to FIGS. 8 to 15.

Figure 8:
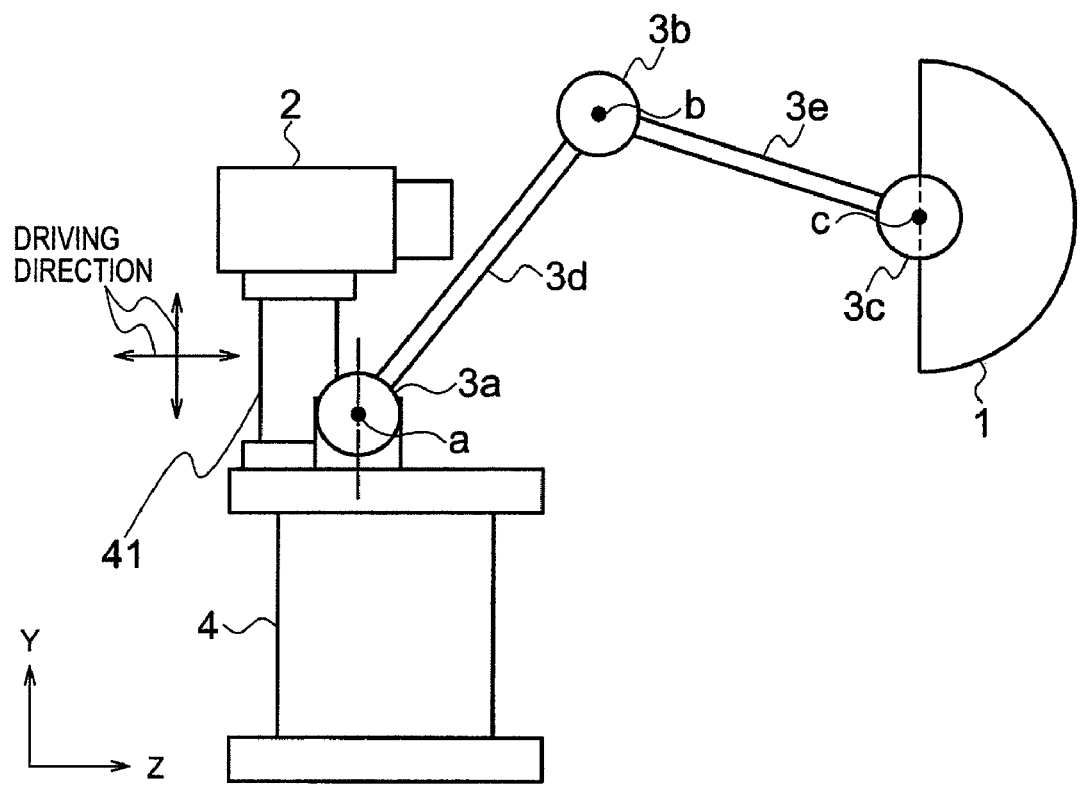
FIG. 8 is a side view showing a structure including a drive mechanism in the image display apparatus to which the present invention is applied.

As shown in FIG. 8, the image display apparatus includes, as the connection mechanism 3, a projector drive mechanism 41, which drives a direction that the projector 2 projects image light so that the optical axis of the image light projected from the projector 2 matches a predetermined position of the screen 1. This projector drive mechanism 41 is provided on the mounting table 4. The projector drive mechanism 41 supports the projector 2 and drives the projector 2 in the vertical and lateral directions. The projector drive mechanism 41 is composed of, for example, a combination of linear and rotary actuators.

Figure 9:
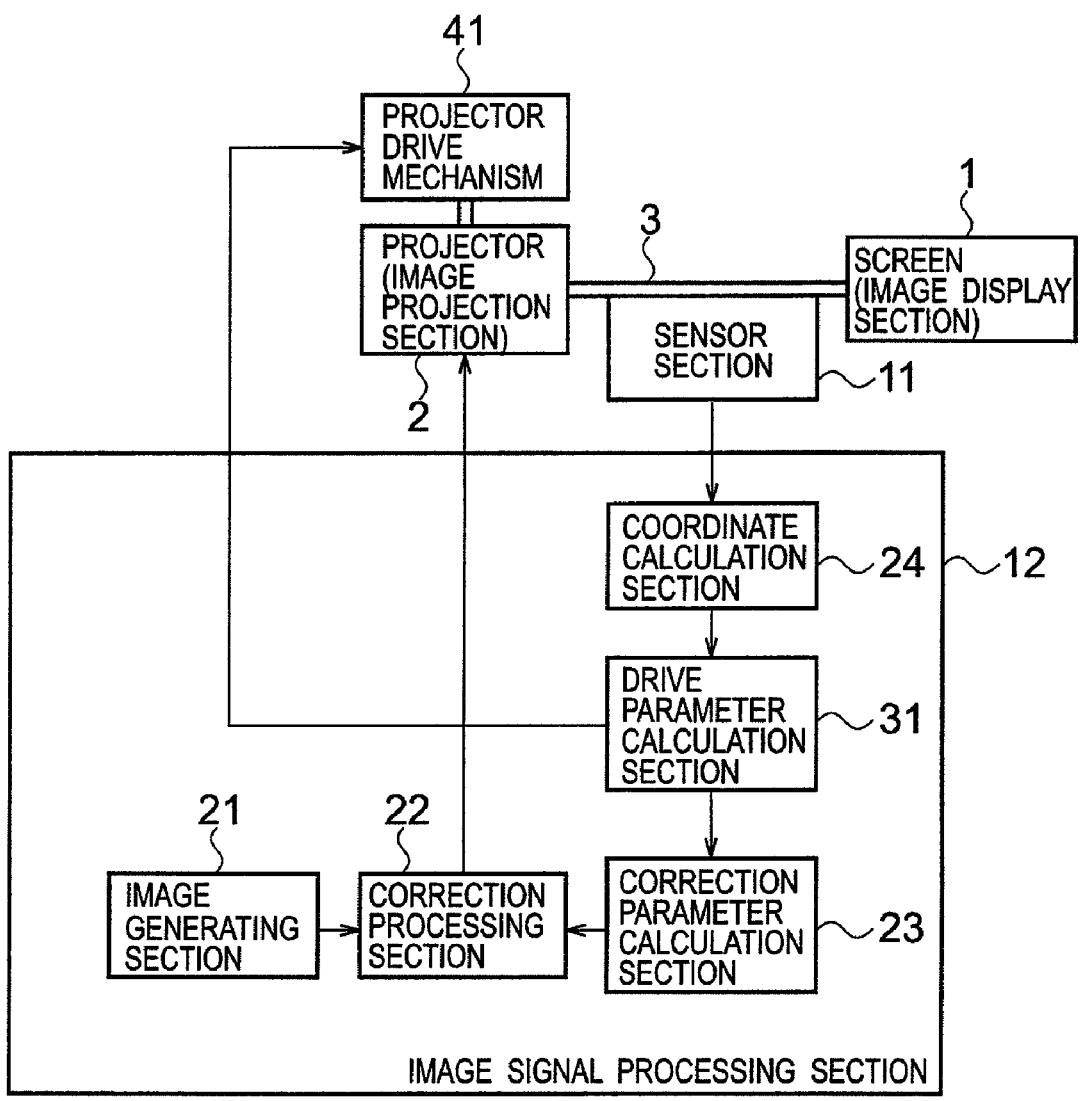
FIG. 9 is a block diagram showing a functional structure including the drive mechanism in which the image display apparatus to which the present invention is applied.

The image signal processing section 12, as shown in FIG. 9, includes a drive parameter calculation section 31, which receives the relative position and posture between the screen 1 and the projector 2 measured and calculated by the sensor section 11 and coordinate calculation section 24 and calculates the driving direction and amount of the projector drive mechanism 41 so that the optical axis of the projector 2 is directed to the center of the screen 1 as the predetermined position.

The drive parameter calculation section 31 supplies the drive parameters including the calculated driving direction and amount of the projector drive mechanism 41 to the projector drive mechanism 41 and causes the projector drive mechanism 41 to change the position of the projector 2. Moreover, the drive parameter calculation section 31 supplies information of the relative position and posture between the screen 1 and the projector 2 which are calculated by the coordinate calculation section 24 and the drive parameters to the correction parameter calculation section 23. The processing to calculate the drive parameters by the drive parameter calculation section 31 is described later.

The correction parameter calculation section 23 calculates the relative position and posture calculated by the coordinate calculation section 24 in response to the direction that the projector 2 projects image light being changed by the projector drive mechanism 41 and updates the correction parameters after the change.

Figure 10:
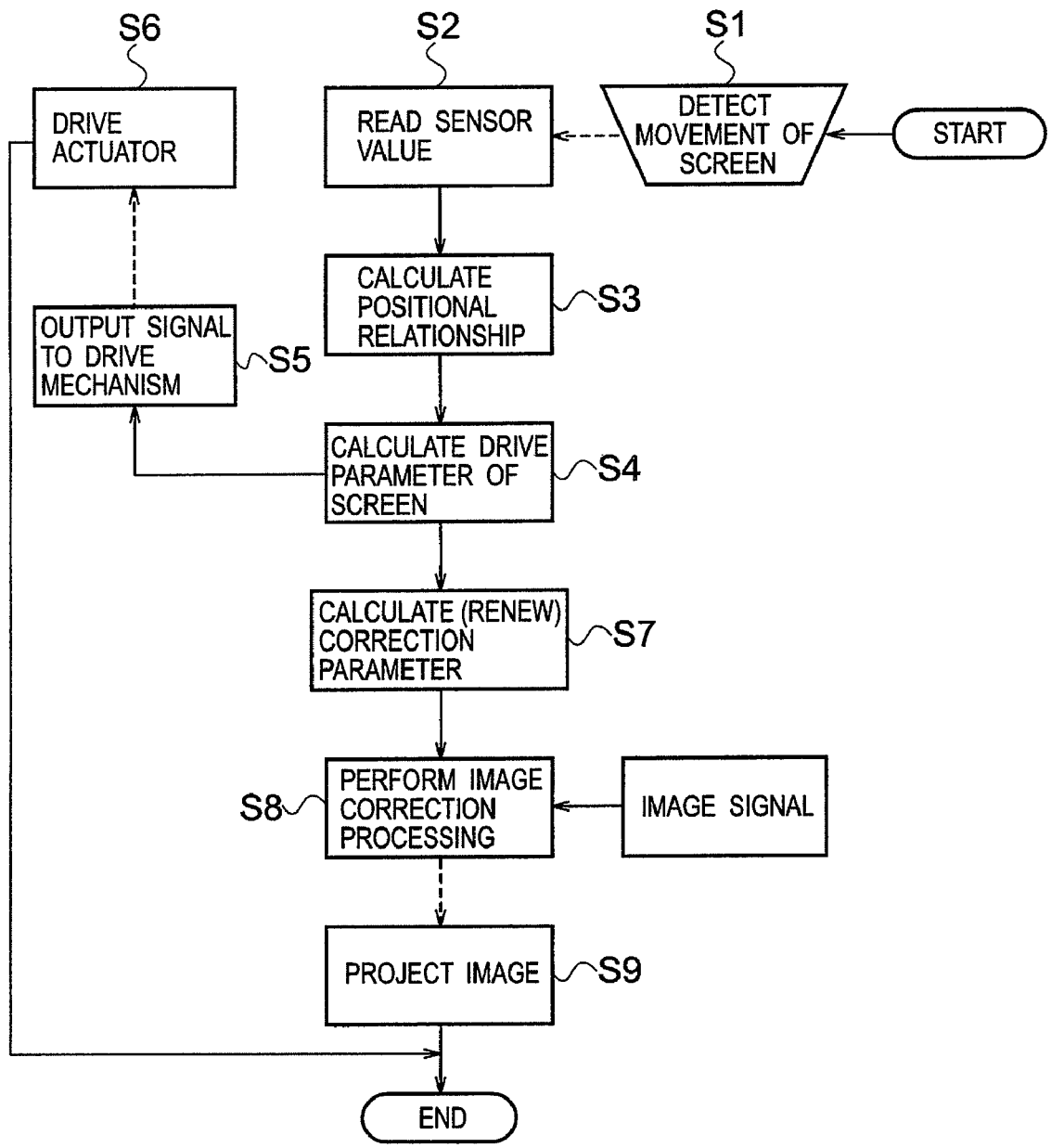
FIG. 10 is a flowchart showing a processing procedure to drive the drive mechanism and project an image onto a screen in the image display apparatus to which the present invention is applied.

In the thus structured image display apparatus, whose operation procedure is shown in FIG. 10, when the sensor section 11 detects movement of the screen 1 in step S1, the coordinate calculation section 24 reads a sensor value of the sensor section 11 in step S2, and the coordinate calculation section 24 calculates the relative position and posture between the screen 1 and the projector 2 and outputs the same to the drive parameter calculation section 31 in step S3.

In step S4, the drive parameter calculation section 31 calculates from the current relative position and posture the drive parameters of the projector drive mechanism 41 which allow the optical axis of the projector 2 to be directed to the center of the screen 1 and outputs the calculated drive parameters to the projector drive mechanism 41 in step S5. In step S6, the linear or rotary actuators of the projector drive mechanism 41 are driven to change the direction of optical axis of the projector 2.

In next step S7, the correction parameter calculation section 23 updates the correction parameters based on the relative position and posture between the screen 1 and the projector 2 which has been driven by the projector drive mechanism 41. In step S8, the correction processing section 22 performs the distortion correction processing for the planar image signal according to the correction parameters for the projector drive mechanism 41 which has been driven. In step 9, the projector 2 projects the image onto the screen 1, thus displaying an image without distortion.

Next, the processing to calculate the drive parameters by the drive parameter calculation section 31 is described.

Figure 11:
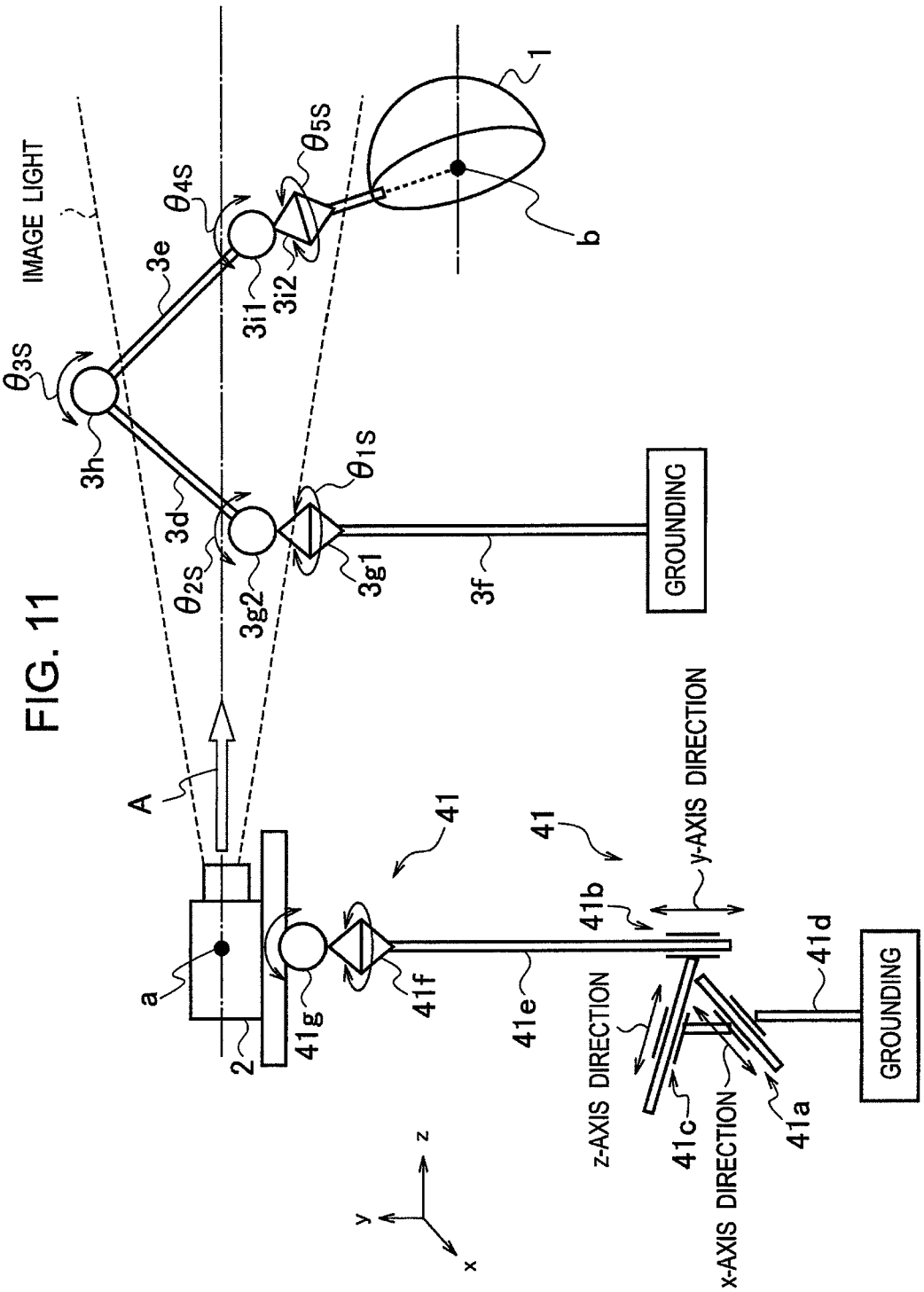
FIG. 11 is a view explaining movable portions of the drive mechanism and a connection mechanism in the image display apparatus to which the present invention is applied.

As shown in FIG. 11, the projector drive mechanism 41 includes linear actuators 41*a*, 41*b*, and 41*c* (hereinafter, referred to as X-axis, Y-axis, and Z-axis linear actuators 41*a*, 41*b*, and 41*c*, respectively), which linearly drive the projector 2 in the X-axis, Y-axis, and Z-axis directions, respectively. The linear actuators 41*a* to 41*c* are grounded on the mounting table 4 with a ground link 41*d* interposed therebetween and connected to the rotary actuators 41*f* and 41*g* with a connection link 41*e* interposed therebetween. The rotary actuator 41*f* is a rotary actuator that rotates the optical axis A of the projector 2 around the connection link 41*e* as a center axis. The rotary actuator 41*g* is a rotary actuator which rotates the optical axis A of the projector 2 around the axis vertical to the optical axis and the axis of rotation of rotary actuator. FIG. 11 shows a state where the screen 1 is automatically or manually moved and is located outside the projection range of the projector 2.

The connection mechanism 3 is composed of a rotary actuator 3*g* (3*g*$_1$, 3*g*$_2$), a rotary actuator 3*h*, and a rotary actuator 3*i* (3*i*$_1$, 3*i*$_2$). The rotary actuator 3*g* is incorporated in the link mechanism 3*a* and provided at a tip of a grounding link 3*f* extended from a virtual grounding point. The rotary actuator 3*h*, which is incorporated in the link mechanism 3*b*, is provided with the arm 3*d* and the rotary actuator 3*g*. The rotary actuator 3*i*, which is incorporated in the link mechanism 3*c*, is provided with the arm 3*e* and the rotary actuator 3*i*. The reference position of the screen 1 is the center position b of the screen 1.

Figure 12:
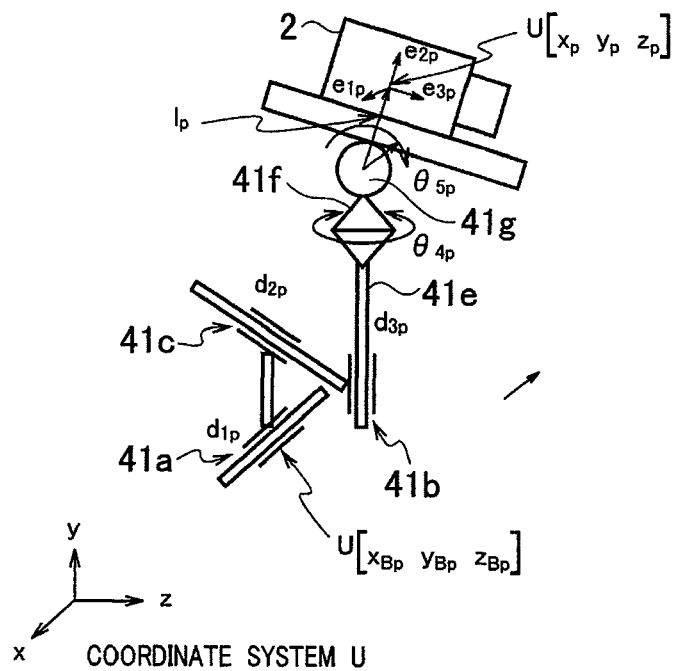
FIG. 12 is a view explaining a coordinate system of the drive mechanism in the image display apparatus to which the present invention is applied.
Figure 13:
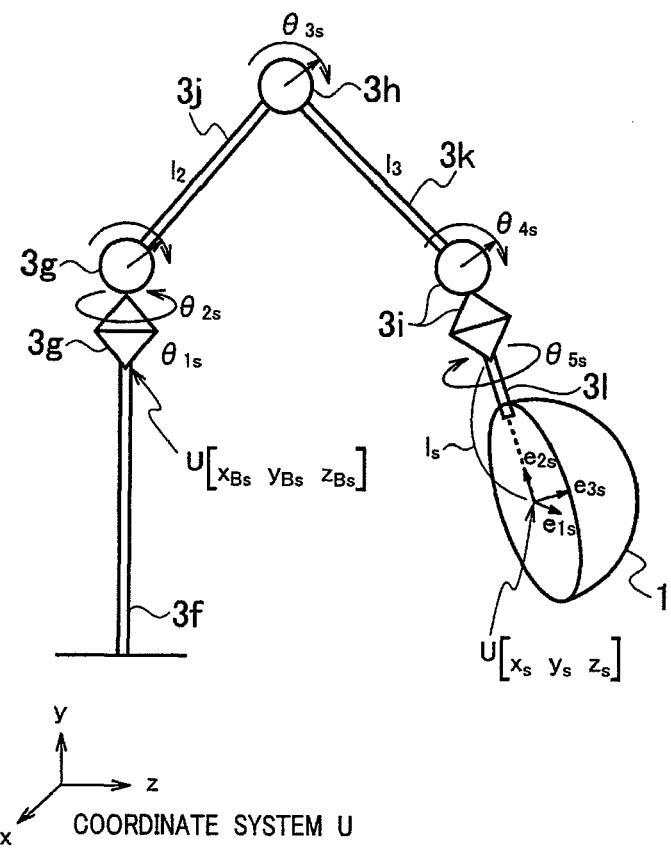
FIG. 13 is a view explaining a coordinate system of the connection mechanism in the image display apparatus to which the present invention is applied.

In the aforementioned projector drive mechanism 41 and connection mechanism 3, as shown in FIGS. 12 and 13, in a coordinate system U, the position of a ground plane of the projector 2 is $^U[\mathrm{x}_{Bp}, \mathrm{y}_{Bp}, \mathrm{z}_{Bp}]$; the posture of the projector 2 is $^U[\mathrm{e}_{1p}, \mathrm{e}_{2p}, \mathrm{e}_{3p}]$; the position of a ground plane of the screen 1 is $^U[\mathrm{x}_{Bs}, \mathrm{y}_{Bs}, \mathrm{z}_{Bs}]$; and the posture of the screen 2 is $^U[\mathrm{e}_{1s}, \mathrm{e}_{2s}, \mathrm{e}_{3s}]$. As shown in FIG. 12, angles of rotary joints i of the rotary actuators 41*f* and 41*g*, which change the position and posture of the projector 2, are indicated by theta ip, and lengths of linear joints i of the linear actuators 41*a* to 41*c*, which change the position and posture of the projector 2, are indicated by d$_{ip}$. As shown in FIG. 13, in the connection mechanism 3, which changes the position and posture of the screen 1, angles of rotary joints i of the link mechanisms 3*a* to 3*c* are indicated by theta is.

In the coordinate system U of the image display apparatus, the position (X, Y, Z) of the screen 1 relative to the projector 2 is expressed by the following arithmetic expressions 1 to 3.

$$X = \left\{ \begin{array}{l} x_{Bs} + l_2\cos\theta_{1s}\cos\theta_{2s} + \\ l_3\cos\theta_{1s}\cos(\theta_{2s} + \theta_{3s}) - \\ l_s\cos\theta_{1s}\sin(\theta_{2s} + \theta_{3s} + \theta_{4s}) \end{array} \right\} - \left\{ \begin{array}{l} x_{Bp} + d_{1p} + \\ l_p\cos\theta_{4p}\cos\theta_{5p} \end{array} \right\} \quad \text{(Equation 1)}$$

$$Y = \left\{ \begin{array}{l} y_{Bs} - l_2\sin\theta_{2s} - \\ l_3\sin(\theta_{2s} + \theta_{3s}) - \\ l_s\cos(\theta_{2s} + \theta_{3s} + \theta_{4s}) \end{array} \right\} - \{y_{Bp} + d_{3p} - l_p\sin\theta_{5p}\} \quad \text{(Equation 2)}$$

-continued $$X = \left\{ \begin{array}{c} z_{Bs} + I_2\sin\theta_{1s}\cos\theta_{2s} + \\ I_3\sin\theta_{1s}\cos(\theta_{2s} + \theta_{3s}) - \\ I_s\sin\theta_{1s}\sin(\theta_{2s} + \theta_{3s} + \theta_{4s}) \end{array} \right\} - \left\{ \begin{array}{c} z_{Bp} + d_{2p} + \\ I_p\sin\theta_{4p}\cos\theta_{5p} \end{array} \right\} \quad \text{(Equation 3)}$$

In the arithmetic expressions 1 and 2, 12 indicates length of the arm 3d; 13, length of the arm 3e; 1s, distance between the rotary actuator 3i and the center position of the screen 1; theta 1s, rotation angle of the rotary actuator $3g_1$; theta 2s, rotation angle of the rotary actuator $3g_2$; theta 3s, rotation angle of the rotary actuator 3h; theta 4s, rotation angle of the rotary actuator $3i_1$; theta 5s, rotation angle of the rotary actuator $3i_2$, $d_{1p}$, changing distance of the X-axis linear actuator 41a; $d_{2p}$, changing distance of the Z-axis linear actuator 41c; $d_{3p}$, changing distance of the X-axis linear actuator 41b; theta 4p, rotation angle of the rotary actuator 41f; and theta 5p, rotation angle of the rotary actuator 41g. For details, as shown FIG. 11, theta is the rotation angle of the rotary actuator $3g_1$, which rotates around grounding link 3f; theta 2s is the rotation angle of the rotary actuator $3g_2$, which rotates around the arm 3d and a direction vertical to the rotary axis of the rotary actuator $3g_1$; theta 3s is the rotation angle of the rotary actuator 3h, which rotates around the arm 3d and a direction vertical to the arm 3e; theta 4s is the rotation angle of the rotary actuator $3i_1$, which rotates around a direction parallel to the rotary axis of the rotary actuator 3h; theta 5s is the rotation angle of the rotary actuator $3i_2$, which rotates around the rotary axis of the rotary actuator $3i_1$ and a direction vertical to the vertical line of projection plane of the screen 1.

In the coordinate system U of the image display apparatus, the posture ($e_1$, $e_2$, $e_3$) of the screen 1 relative to the projector 2 is expressed by the following arithmetic expressions 4 to 6.

$$e_1 = \begin{bmatrix} \sin(\theta_{1s} - \theta_{4p})\cos(\theta_{2s} + \theta_{3s} + \theta_{4s}) \\ \sin\theta_{5s} + \cos(\theta_{1s} - \theta_{4p})\cos\theta_{5s} \\ -\cos(\theta_{1s} - \theta_{4p})\cos(\theta_{2s} + \theta_{3s} + \theta_{4s})\sin\theta_{5s}\cos\theta_{5p} + \\ \sin(\theta_{1s} - \theta_{4p})\cos\theta_{5s}\cos\theta_{5p} - \\ \sin(\theta_{2s} + \theta_{3s} + \theta_{4s})\sin\theta_{5s}\sin\theta_{5p} \\ \cos(\theta_{1s} - \theta_{4p})\cos(\theta_{2s} + \theta_{3s} + \theta_{4s})\sin\theta_{5s}\sin\theta_{5p} - \\ \sin(\theta_{1s} - \theta_{4p})\cos\theta_{5s}\sin\theta_{5p} - \\ \sin(\theta_{2s} + \theta_{3s} + \theta_{4s})\sin\theta_{5s}\cos\theta_{5p} \end{bmatrix} \quad \text{(Equation 4)}$$

$$e_2 = \begin{bmatrix} -\sin(\theta_{1s} - \theta_{4p})\sin(\theta_{2s} + \theta_{3s} + \theta_{4s}) \\ \cos(\theta_{1s} - \theta_{4p})\sin(\theta_{2s} + \theta_{3s} + \theta_{4s})\cos\theta_{5p} - \\ \cos(\theta_{2s} + \theta_{3s} + \theta_{4s})\sin\theta_{5p} \\ -\cos(\theta_{1s} - \theta_{4p})\sin(\theta_{2s} + \theta_{3s} + \theta_{4s})\sin\theta_{5p} - \\ \cos(\theta_{2s} + \theta_{3s} + \theta_{4s})\cos\theta_{5p} \end{bmatrix} \quad \text{(Equation 5)}$$

$$e_3 = \begin{bmatrix} -\sin(\theta_{1s} - \theta_{4p})\cos(\theta_{2s} + \theta_{3s} + \theta_{4s}) \\ \cos\theta_{5s} + \cos(\theta_{1s} - \theta_{4p})\sin\theta_{5s} \\ \cos(\theta_{1s} - \theta_{4p})\cos(\theta_{2s} + \theta_{3s} + \theta_{4s})\cos\theta_{5s}\cos\theta_{5p} + \\ \sin(\theta_{1s} - \theta_{4p})\sin\theta_{5s}\cos\theta_{5p} + \\ \sin(\theta_{2s} + \theta_{3s} + \theta_{4s})\cos\theta_{5s}\sin\theta_{5p} \\ -\cos(\theta_{1s} - \theta_{4p})\cos(\theta_{2s} + \theta_{3s} + \theta_{4s})\cos\theta_{5s}\sin\theta_{5p} - \\ \sin(\theta_{1s} - \theta_{4p})\sin\theta_{5s}\sin\theta_{5p} + \\ \sin(\theta_{2s} + \theta_{3s} + \theta_{4s})\cos\theta_{5s}\cos\theta_{5p} \end{bmatrix} \quad \text{(Equation 6)}$$

Moreover, in the coordinate system U, the position $^U[x_s, y_s, z_s]$ of the screen 1 is expressed by the following arithmetic expressions 7 to 9.

$$^Ux_s = {}^Ux_{Bs} + I_2\cos\theta_{1s}\cos\theta_{2s} + I_3\cos\theta_{1s}\cos(\theta_{2s} + \theta_{3s}) - I_s\cos\theta_{1s}\sin(\theta_{2s} + \theta_{3s} + \theta_{4s}) \quad \text{(Equation 7)}$$

$$^Uy_s = {}^Uy_{Bs} - I_2\sin\theta_{2s} - I_3\sin(\theta_{2s} + \theta_{3s}) - I_s\cos(\theta_{2s} + \theta_{3s} + \theta_{4s}) \quad \text{(Equation 8)}$$

$$^Uz_s = {}^Uz_{Bs} + I_2\sin\theta_{1s}\cos\theta_{2s} + I_3\sin\theta_{1s}\cos(\theta_{2s} + \theta_{3s}) - I_s\sin\theta_{1s}\sin(\theta_{2s} + \theta_{3s} + \theta_{4s}) \quad \text{(Equation 9)}$$

Still moreover, in the coordinate system U, the posture $^U[e_{1s}, e_{2s}, e_{3s}]$ of the screen 1 is expressed by the following arithmetic expressions 10 to 12.

$$^Ue_{1s} = \begin{bmatrix} -\cos\theta_{1s}\cos(\theta_{2s} + \theta_{3s} + \theta_{4s})\sin\theta_{5s} + \sin\theta_{1s}\cos\theta_{5s} \\ \sin(\theta_{2s} + \theta_{3s} + \theta_{4s})\sin\theta_{5s} \\ -\sin\theta_{1s}\cos(\theta_{2s} + \theta_{3s} + \theta_{4s})\sin\theta_{5s} - \cos\theta_{1s}\cos\theta_{5s} \end{bmatrix} \quad \text{(Equation 10)}$$

$$^Ue_{2s} = \begin{bmatrix} \cos\theta_{1s}\sin(\theta_{2s} + \theta_{3s} + \theta_{4s}) \\ \cos(\theta_{2s} + \theta_{3s} + \theta_{4s}) \\ \sin\theta_{1s}\sin(\theta_{2s} + \theta_{3s} + \theta_{4s}) \end{bmatrix} \quad \text{(Equation 11)}$$

$$^Ue_{3s} = \begin{bmatrix} \cos\theta_{1s}\cos(\theta_{2s} + \theta_{3s} + \theta_{4s})\cos\theta_{5s} + \sin\theta_{1s}\sin\theta_{5s} \\ -\sin(\theta_{2s} + \theta_{3s} + \theta_{4s})\cos\theta_{5s} \\ \sin\theta_{1s}\cos(\theta_{2s} + \theta_{3s} + \theta_{4s})\cos\theta_{5s} - \cos\theta_{1s}\sin\theta_{5s} \end{bmatrix} \quad \text{(Equation 12)}$$

Moreover, in the coordinate system U, the position $^U[x_p, y_p, z_p]$ of the projector 2 is expressed by the following arithmetic expressions 13 to 15.

$$^Ux_p = {}^Ux_{Bp} + d_{1p} + I_p\cos\theta_{4p}\cos\theta_{5p} \quad \text{(Equation 13)}$$

$$^Uy_p = {}^Uy_{Bp} + d_{3p} - I_p\sin\theta_{5p} \quad \text{(Equation 14)}$$

$$^Uz_p = {}^Uz_{Bp} + d_{2p} + I_p\sin\theta_{4p}\cos\theta_{5p} \quad \text{(Equation 15)}$$

Still moreover, in the coordinate system U, the posture $^U[e_{1p}, e_{2p}, e_{3p}]$ of the projector 2 is expressed by the following arithmetic expressions 16 to 18.

$$^Ue_{1p} = \begin{bmatrix} \sin\theta_{4p} \\ 0 \\ -\cos\theta_{4p} \end{bmatrix} \quad \text{(Equation 16)}$$

$$^Ue_{2p} = \begin{bmatrix} \cos\theta_{4p}\cos\theta_{5p} \\ -\sin\theta_{5p} \\ \sin\theta_{4p}\cos\theta_{5p} \end{bmatrix} \quad \text{(Equation 17)}$$

$$^Ue_{3p} = \begin{bmatrix} -\cos\theta_{4p}\sin\theta_{5p} \\ -\cos\theta_{5p} \\ -\sin\theta_{4p}\sin\theta_{5p} \end{bmatrix} \quad \text{(Equation 18)}$$

The position of the screen 1 relative to the projector 2 which is expressed by the arithmetic expressions 1 to 3 is obtained by calculating a relative relationship between the position of the screen 1 expressed by the arithmetic expressions 7 to 9 and the position of the projector 2 expressed by the arithmetic expressions 13 to 15. The posture of the screen 1 relative to the projector 2 which is expressed by the following arithmetic expressions 4 to 6 is obtained by calculating a relative relationship between the posture of the screen 1 expressed by the arithmetic expressions 10 to 12 and the posture of the projector 2 expressed by the arithmetic expressions 16 to 18.

In the aforementioned image display apparatus, when the position of the projector 2 is controlled by translational motions of the projector drive mechanism 41, the drive parameter calculation section 31 controls the changing distance $d_{1p}$ of the projector 2 in the X-axis direction and the changing distance $d_{3p}$ of the projector 2 in the Y-axis direction so that the optical axis of the projector 2 is directed to the center part of the screen 1. The changing distances $d_{1p}$ and $d_{3p}$, which allow the optical axis of the projector 2 to be directed to the center part of the screen 1, are shown in the following arithmetic expressions 19 and 20.

$$d_{1p} = A - Z\cot\theta_{4p} \qquad \text{(Equation 19)}$$

$$d_{3p} = B - Z\frac{\cot\theta_{5p}}{\sin\theta_{4p}} \qquad \text{(Equation 20)}$$

$$A \equiv \left\{\begin{array}{l} x_{Bs} + l_2\cos\theta_{1s}\cos\theta_{2s} + \\ l_3\cos\theta_{1s}\cos(\theta_{2s} + \theta_{3s}) - \\ l_s\cos\theta_{1s}\sin(\theta_{2s} + \theta_{3s} + \theta_{4s}) \end{array}\right\} - \left\{\begin{array}{c} x_{Bp} + l_p \\ \cos\theta_{4p}\cos\theta_{5p} \end{array}\right\} \qquad \text{(Equation 21)}$$

$$B \equiv \left\{\begin{array}{l} y_{Bs} - l_2\sin\theta_{2s} - \\ l_3\sin(\theta_{2s} + \theta_{3s}) - \\ l_s\cos(\theta_{2s} + \theta_{3s} + \theta_{4s}) \end{array}\right\} - \left\{\begin{array}{c} y_{Bp} - l_p \\ \sin\theta_{5p} \end{array}\right\} \qquad \text{(Equation 22)}$$

$$Z \equiv \left\{\begin{array}{l} z_{Bs} + l_2\sin\theta_{1s}\cos\theta_{2s} + \\ l_3\sin\theta_{1s}\cos(\theta_{2s} + \theta_{3s}) - \\ l_s\sin\theta_{1s}\sin(\theta_{2s} + \theta_{3s} + \theta_{4s}) \end{array}\right\} - \left\{\begin{array}{c} z_{Bp} + d_{2p} + l_p \\ \sin\theta_{4p}\cos\theta_{5p} \end{array}\right\} \qquad \text{(Equation 23)}$$

A, B, and Z in the arithmetic expressions 19 and 20 are expressed by the following arithmetic expressions 21 to 23, respectively. A of the arithmetic expression 21 is a relative position of the screen 1 to the projector 2 in the X-axis direction which is obtained by the arithmetic expression 1. B of the arithmetic expression 22 is a relative position of the screen 1 to the projector 2 in the Y-axis direction which is obtained by the arithmetic expression 2. Z of the arithmetic expression 23 indicates a relative position of the screen 1 to the projector 2 in the Z-axis direction which is obtained by the arithmetic expression 3.

Figure 14:
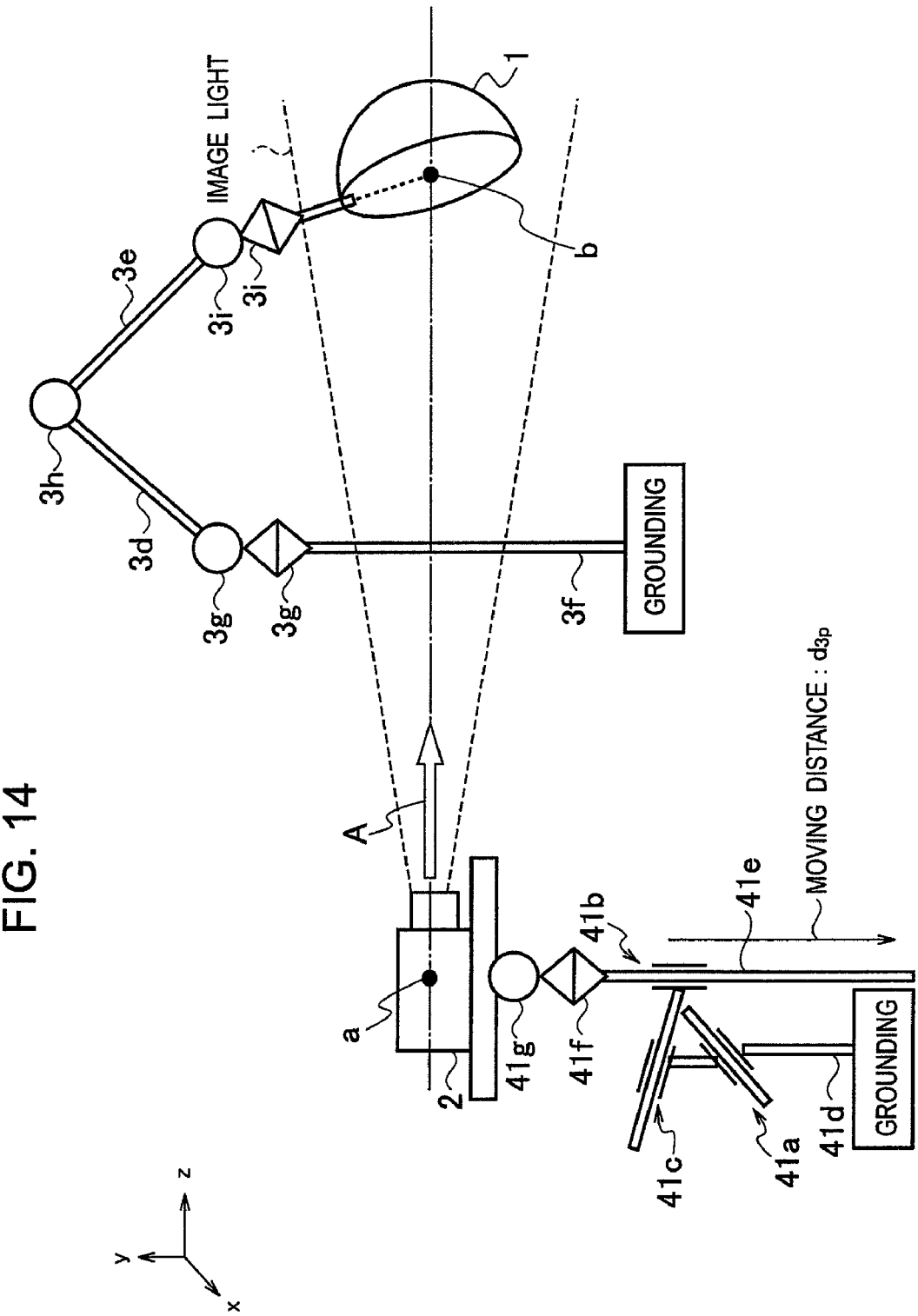
FIG. 14 is a view explaining an operation to linearly drive a projector and align an optical axis of the projector with the center position of the screen in the image display apparatus to which the present invention is applied.

When calculating the changing distance $d_{3p}$ of the projector 2 in the Y-axis direction from these arithmetic expressions 19 to 23, the drive parameter calculation section 31 generates the drive parameters so that the projector 2 moves by the changing distance $d_{3p}$ as shown in FIG. 14 and drives the Y-axis linear actuator 41b so that the center part of the screen 1 intersects the optical axis of the projector 2.

When the posture of the projector 2 is controlled by rotational motion in the projector drive mechanism 41, the drive parameter calculation section 31 controls the rotation angles theta 4p and theta 5p of the projector 2 so that the optical axis of the projector 2 is directed to the center part of the screen 1. The rotation angles theta 4p and theta 5p, which allow the optical axis of the projector 2 to be directed to the center part of the screen 1, are expressed by the following arithmetic expressions 24 and 25.

$$\theta_{4p} = \tan^{-1}\frac{Z}{X} \qquad \text{(Equation 24)}$$

$$\theta_{5p} = \tan^{-1}\frac{2}{Y\sin\theta_{4p}} \qquad \text{(Equation 25)}$$

$$X \equiv \left\{\begin{array}{l} x_{Bs} + l_2\cos\theta_{1s}\cos\theta_{2s} + \\ l_3\cos\theta_{1s}\cos(\theta_{2s} + \theta_{3s}) - \\ l_s\cos\theta_{1s}\sin(\theta_{2s} + \theta_{3s} + \theta_{4s}) \end{array}\right\} - \left\{\begin{array}{c} x_{Bp} + d_{1p} + l_p \\ \cos\theta_{4p}\cos\theta_{5p} \end{array}\right\} \qquad \text{(Equation 26)}$$

-continued $$Y \equiv \left\{\begin{array}{l} y_{Bs} - l_2\sin\theta_{2s} - \\ l_3\sin(\theta_{2s} + \theta_{3s}) - \\ l_s\cos(\theta_{2s} + \theta_{3s} + \theta_{4s}) \end{array}\right\} - \left\{\begin{array}{c} y_{Bp} + d_{3p} - l_p \\ \sin\theta_{5p} \end{array}\right\} \qquad \text{(Equation 27)}$$

$$Z \equiv \left\{\begin{array}{l} z_{Bs} + l_2\sin\theta_{1s}\cos\theta_{2s} + \\ l_3\sin\theta_{1s}\cos(\theta_{2s} + \theta_{3s}) - \\ l_s\sin\theta_{1s}\sin(\theta_{2s} + \theta_{3s} + \theta_{4s}) \end{array}\right\} - \left\{\begin{array}{c} z_{Bp} + d_{2p} + l_p \\ \sin\theta_{4p}\cos\theta_{5p} \end{array}\right\} \qquad \text{(Equation 28)}$$

X, Y, and Z in the arithmetic expressions 24 and 25 are expressed by the above arithmetic expressions 26 to 28. A of the arithmetic expression 26 is a relative position between the screen 1 and the projector 2 in the X-axis direction which is obtained by the arithmetic expression 1. B of the arithmetic expression 27 is a relative position between the screen 1 and the projector 2 in the Y-axis direction which is obtained by the arithmetic expression 2. Z of the arithmetic expression 28 is a relative position between the screen 1 and the projector 2 in the Z-axis direction which is obtained by the arithmetic expression 3.

Figure 15:
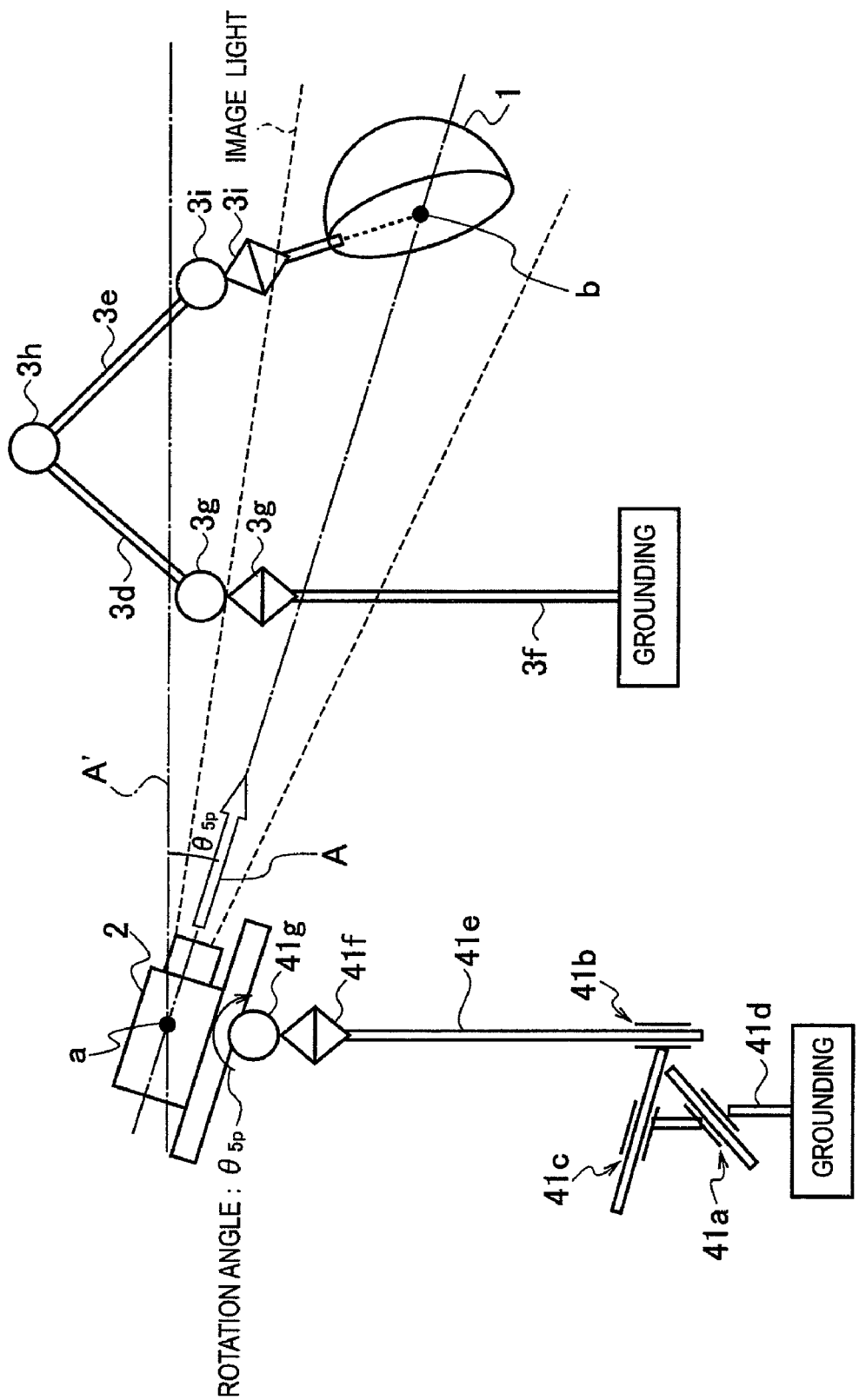
FIG. 15 is a view explaining an operation to rotationally drive the projector and align the optical axis of the projector with the center position of the screen in the image display apparatus to which the present invention is applied.

After calculating the rotation angle theta 5p of the projector 2 from these arithmetic expressions 24 to 26, the drive parameter calculation section 31 generates the drive parameters so that the projector 2 rotates by the rotation angle theta 5p as shown in FIG. 15 and causes the rotary actuator 41g to rotate by theta 5p so that the optical axis of the projector 2 intersects the center part of the screen 1.

With the thus structured image display apparatus, even when the screen 1 is manually moved and located outside the projection range of the projector 2 as shown in FIG. 11, the projector drive mechanism 41 can be controlled so that the optical axis of the projector 2 is directed to the center part of the screen 1. It is therefore possible to surely project an image without distortion onto the screen 1.

Next, in the image display apparatus which the present invention is applied to, a description is given of a structure which allows image light from the projector 2 to be surely projected on the entire surface of the screen 1 with reference to FIGS. 16 to 23.

Figure 16:
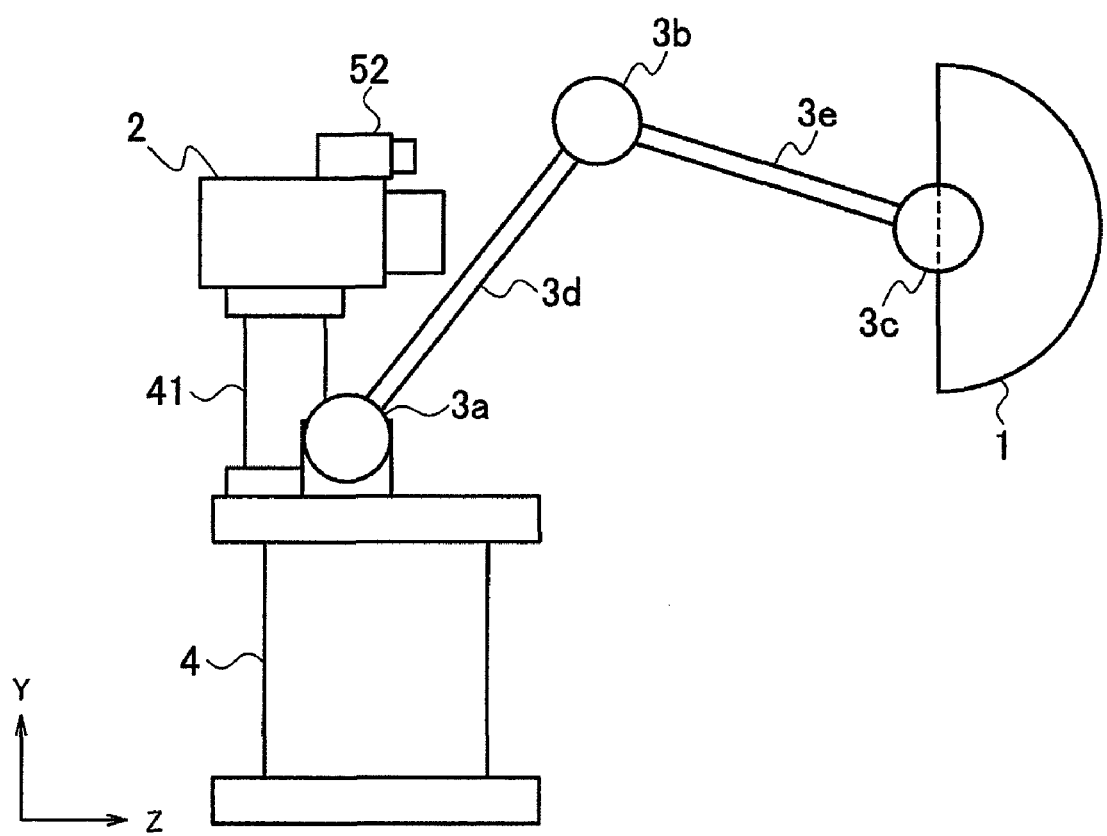
FIG. 16 is a side view showing a structure including a condition detecting mechanism to detect a display condition of the screen in the image display apparatus to which the present invention is applied.
Figure 17:
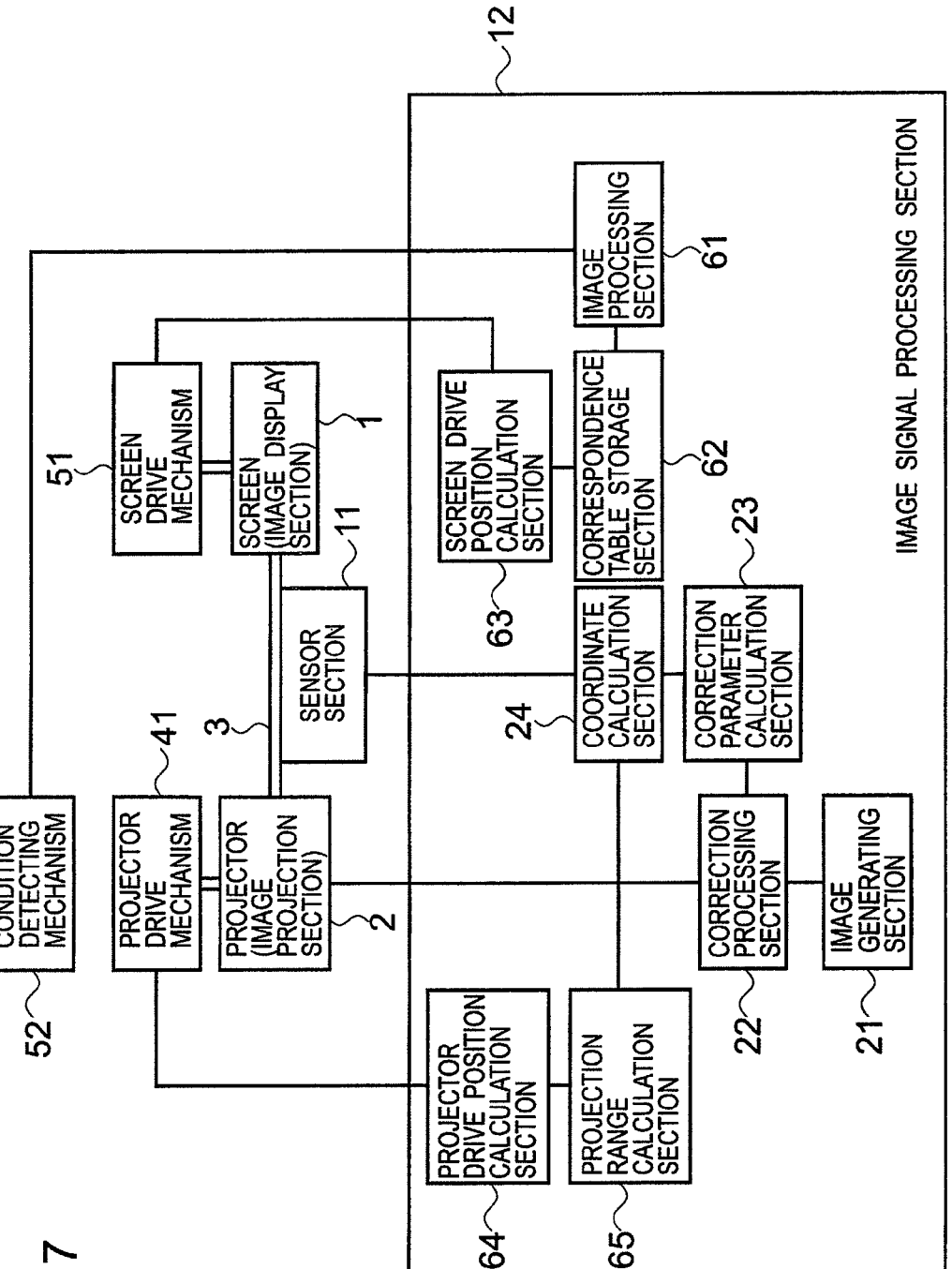
FIG. 17 is a block diagram showing a structure judging the display condition of the screen and moving the screen according to the display condition of the screen in the image display apparatus to which the present invention is applied.

As shown in FIG. 16, this image display apparatus includes a condition detecting mechanism 52, which is a camera detecting an image display range of the screen 1, and judges whether image light is projected onto the entire surface of the screen 1. Such judgment processing is performed by an image processing section 61, which is connected to the condition detecting mechanism 52 as shown in FIG. 17. When the image processing section 61 judges that an image is not projected on the entire surface of the screen 1, a screen drive calculation section 63 refers to a correspondence table stored in a correspondence table storage section 62, and the relative position and posture between the screen 1 and the projector 2 are changed so that the image light is projected onto the entire surface of the screen 1.

When image light is not projected on the entire surface of the screen 1, the position and posture of only the screen 1 may be changed, or the position and posture of only the projector 2 may be changed. Alternatively, the positions and postures of both the screen 1 and projector 2 may be changed so that image light from the projector 2 is projected onto the entire surface of the screen 1.

The image processing section 61 of the image signal processing section 12 receives an image signal of the image detected by the condition detecting mechanism 52; analyzes the image signal; and then judges whether there is a shadow in the image being displayed on the screen 1. For example, when there is a group of pixels having lower brightness than a predetermined brightness, the image processing section 61 determines the group of pixels as a shadow. Causes for occurrence of a shadow on the screen include situations where: an obstacle is located on an optical path from the projector 2 to the screen 1 to block image light; and the rotation angle of the screen 1 with respect to the optical axis direction of the projector 2 is large and a part of the screen 1 blocks image light.

When judging that there is a shadow on the screen 1, the image processing section 61 judges an area of the screen 1 including the shadow and notifies the screen drive calculation section 63 of the same. The correspondence table storage section 62 stores a correspondence table describing a correspondence relationship between the area of the screen 1 including the shadow and the directions in which the position and posture of the screen 1 are changed and the amounts of the changes. Accordingly, the screen drive calculation section 63 generates the drive parameters for the screen 1 with reference to the correspondence table upon being notified by the image processing section 61 of the area including the shadow and outputs a control signal to drive a screen drive mechanism 51, which is composed of the rotary actuators within the link mechanisms 3a to 3c in order to change the position and posture of the screen 1 so that the shadow is not displayed on the screen 1.

Figure 18:
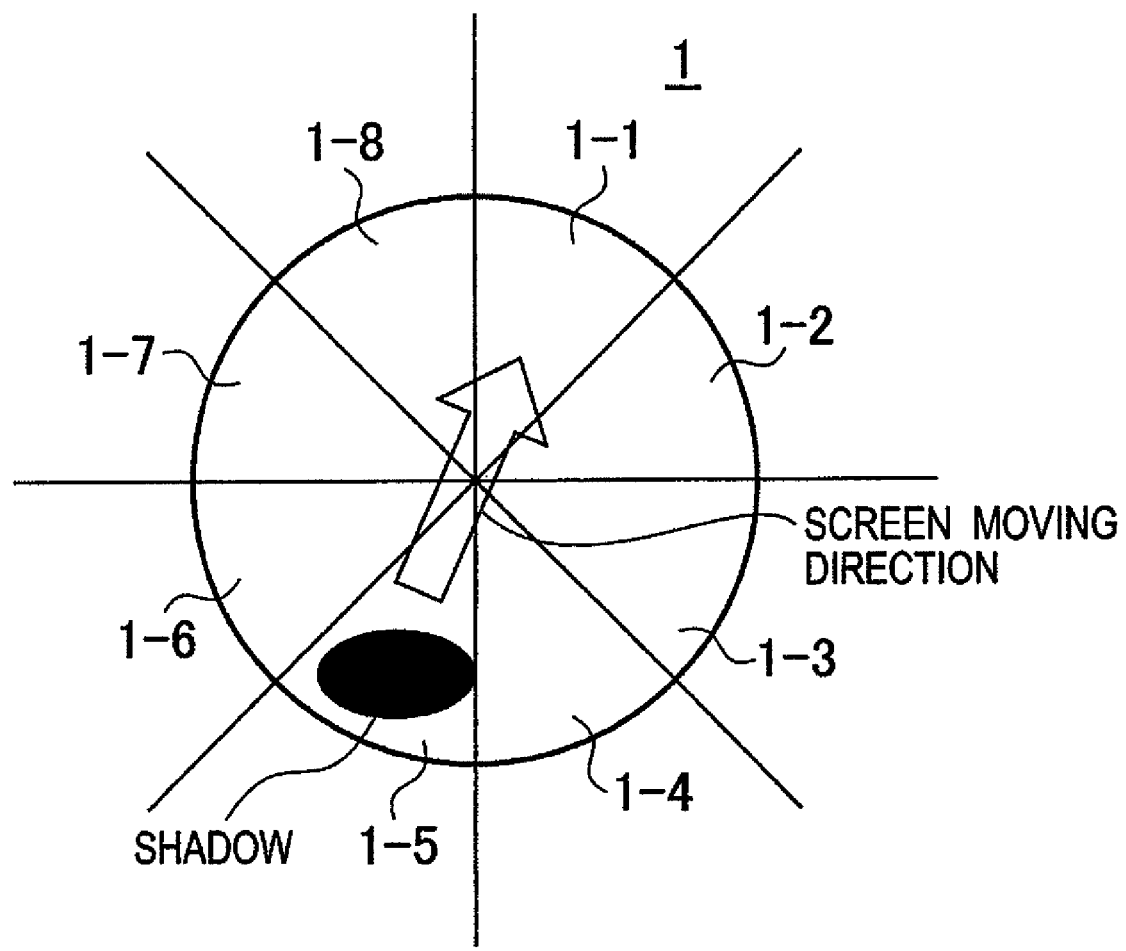
FIG. 18 is a plan view of the screen for explaining a moving direction of the screen according to an image projection area including a shadow in the image display apparatus to which the present invention is applied.

The image processing section 61 previously sets, for example, image projection areas 1-1, 1-2, 1-3, 1-4, 1-5, 1-6, 1-7, and 1-8, which are obtained by dividing the hemispherical projection plane of screen 1 into eight areas as shown in FIG. 18 and judges which image projection area includes a shadow. In the correspondence table, the moving direction and amount of the screen 1 that the screen 1 is moved from the image projection area including a shadow toward the center position thereof are registered. For example, when it is judged by the image processing section 61 that the image projection area 1-5 includes a shadow, the screen 1 is moved in a direction indicated by an arrow in FIG. 18, or in a direction from the image projection area 1-5 to the image projection area 1-1.

When the rotary actuators within the link mechanisms 3a to 3c are driven by the control signal from the screen drive calculation section 63 to the screen drive mechanism 51 to change the position and posture of the screen 1 relative to the projector 2, the changes in the position and posture of the screen 1 are detected by the sensor section 11. The relative position and posture between the screen 1 and the projector 2 are recalculated, and the correction parameters are updated. The image signal from the image generating section 21 is then subjected to the distortion correction processing using the updated correction parameters, thus making it possible to display an image on the screen 1 without distortion and a shadow.

The image signal processing section 12 inputs the relative position and posture between the screen 1 and the projector 2 which are obtained from the coordinate calculation section 24 and calculates a current projection range of the projector 2 by the projection range calculation section 65. This projection range calculation section 65 judges whether image light is projected onto the entire surface of the screen 1 based on the optical axis direction of the projector 2, the angle of field of the projector 2, the center position of the screen 1, the distance between the screen 1 and the projector 2, and the like. When it is judged that image light is not projected onto the entire surface of the screen 1, a projector drive position calculation section 64 generates the drive parameters which change the position and posture of the projector 2 and drives the projector drive mechanism 41.

After the linear and rotary actuators of the projector drive mechanism 41 are driven to change the position and posture of the projector 2 relative to the screen 1, the correction parameters are updated by the correction parameter calculation section 23. The image signal from the image generating section 21 is then subjected to the distortion correction processing using the updated correction parameters, making it possible to display an image on the screen 1 without distortion and a shadow.

Figure 19:
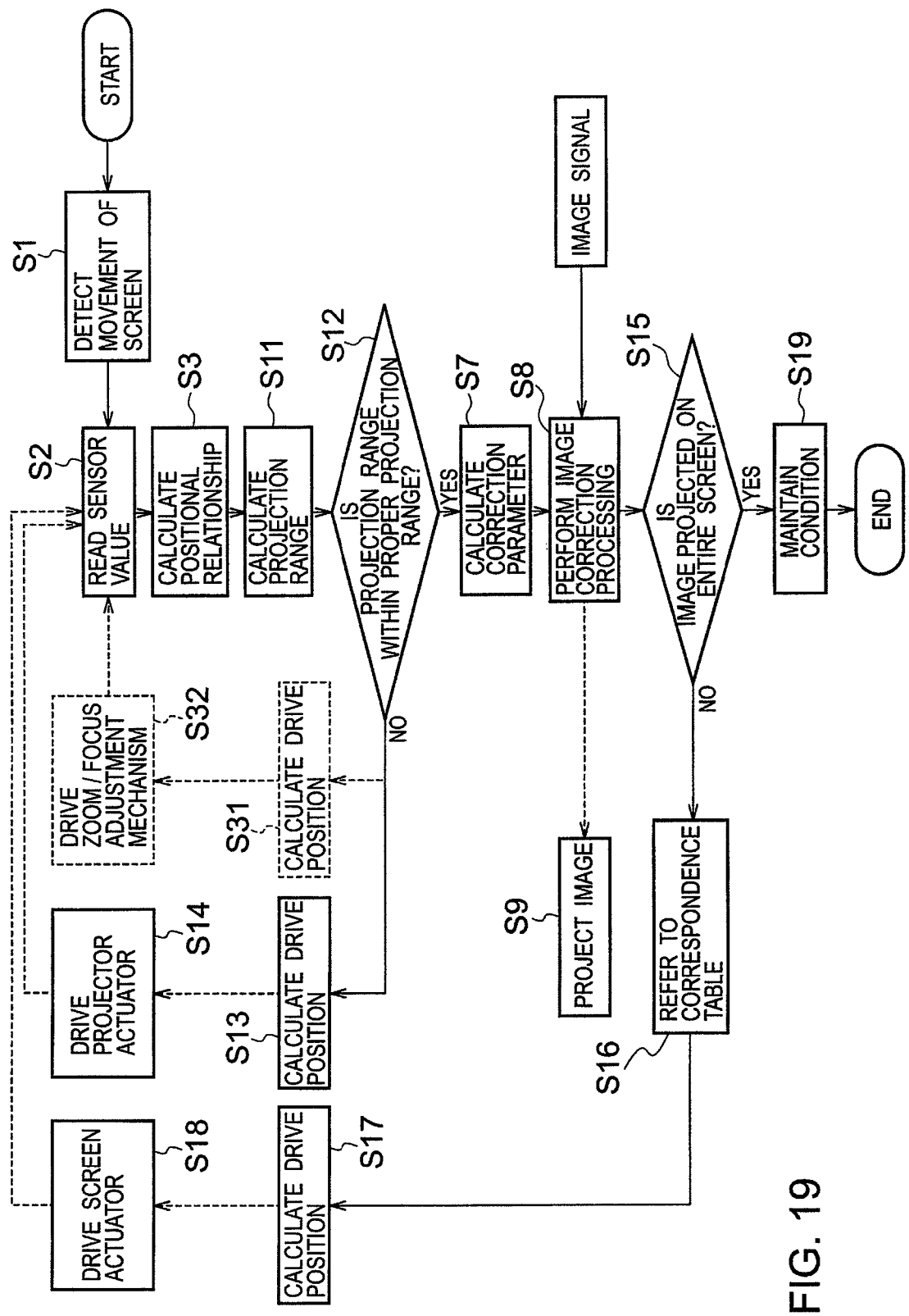
FIG. 19 is a flowchart showing a processing procedure to judge the display condition of the screen and move the screen according to the display condition in the image display apparatus to which the present invention is applied.

The operation of the aforementioned image display apparatus is shown in FIG. 19. The operation shown in FIG. 19 includes both an operation to change the position and posture of the screen 1 and an operation to change the position and posture of the projector 2.

In the image display apparatus, after the relative position and posture between the screen 1 and the projector 2 are calculated by the process of steps S1 to S3, the projection range of the projector 2 is calculated by the projection range calculation section 65 in step S11, and it is judged whether image light is projected within such a proper projection range that image light is projected onto the entire surface of the screen 1 in step S12. When it is judged that image light is projected within the proper projection range, the process proceeds to the step S7 and subsequent steps, and otherwise, the process proceeds to step S13.

In the step S13, in the image display apparatus, the position to which the projector 2 is driven is calculated by the projector drive position calculation section 64 so that the projection range of the projector 2 is within the proper projection range, and the drive parameters are supplied to the projector drive mechanism 41. In step S14, the linear and rotary actuators of the projector drive mechanism 41 are thereby driven to change the position and posture of the projector 2.

After the projection range of the projector 2 is judged in the step S12 to be within the proper projection range, the correction parameters for the distortion correction processing are calculated in consideration of the data of the angle of field adjusted by a later-described zoom/focus adjustment mechanism, and the distortion correction processing is performed for a planar image signal in the step S8 using the calculated correction parameters. In step S9, an image is then projected by the projector 2.

In step S15 subsequent to the step S8, in the image display apparatus, the image processing section 61 analyzes the projection condition of the screen 1 detected by the condition detecting mechanism 52 and judges whether the image is projected onto the entire surface of the screen 1. When image light is projected onto the screen 1 without a shadow, the process proceeds to step S19, and the current relative position and posture between the screen 1 and the projector 2 are maintained, terminating the process.

On the other hand, when it is judged in the step S15 that the image projection range of the screen 1 includes a shadow, the image processing section 61 calculates the image projection area including the shadow and notifies the screen drive calculation section 63.

Next, in step S16, the screen drive calculation section 63 refers to the correspondence table of the correspondence table storage section 62 according to the image projection area judged in the step S15 to include the shadow; and calculates the moving directions and amounts of the position and posture of the screen 1 and then supplies the drive parameters to the screen drive mechanism 51 in step S17. In step S18, the rotary actuators incorporated in the link mechanisms 3a to 3c of the screen drive mechanism 51 can be thereby driven to change the position and posture of the screen 1.

In the image display apparatus described with reference to FIGS. 16 to 19, image light from the projector 2 may be projected on the entire surface of the screen 1 by: calculating the distance between the screen 1 and the projector 2 and the degree of expansion or condensation of image light to be projected from the projector 2 by the coordinate calculation section 24; and controlling a zoom mechanism (for expansion and condensation of image light) and a focus mechanism (for focusing according to the distance to the screen 1) which are included in the projector drive mechanism 41 in FIG. 16.

In this image display apparatus, like a process indicated by dot lines of FIG. 19, when image light is not judged in the step S12 to be within the proper projection range, where the image light is projected onto the entire surface of the screen 1, the projection range calculation section 65 calculates a desired projection range of the projector 2 in step S31, and the zoom/focus adjustment mechanism of the projector drive mechanism 41 are driven so that the image light is projected to the desired projection range. The zoom and focus can be thereby adjusted so as to provide the proper projection range where image light is projected onto the entire surface of the screen 1.

Figure 20:
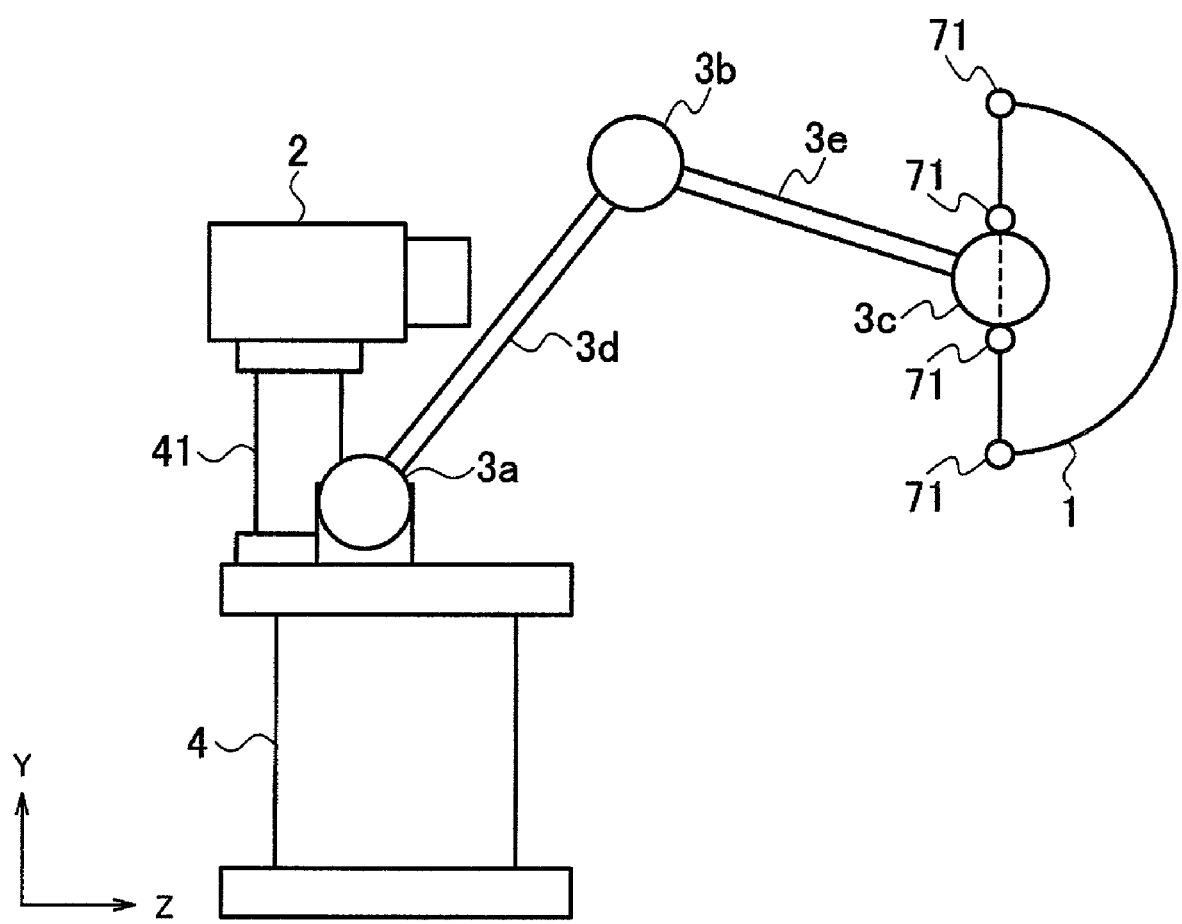
FIG. 20 is a side view showing a structure includes optical sensors in an edge portion of the screen in the image display apparatus to which the present invention is applied.
Figure 21:
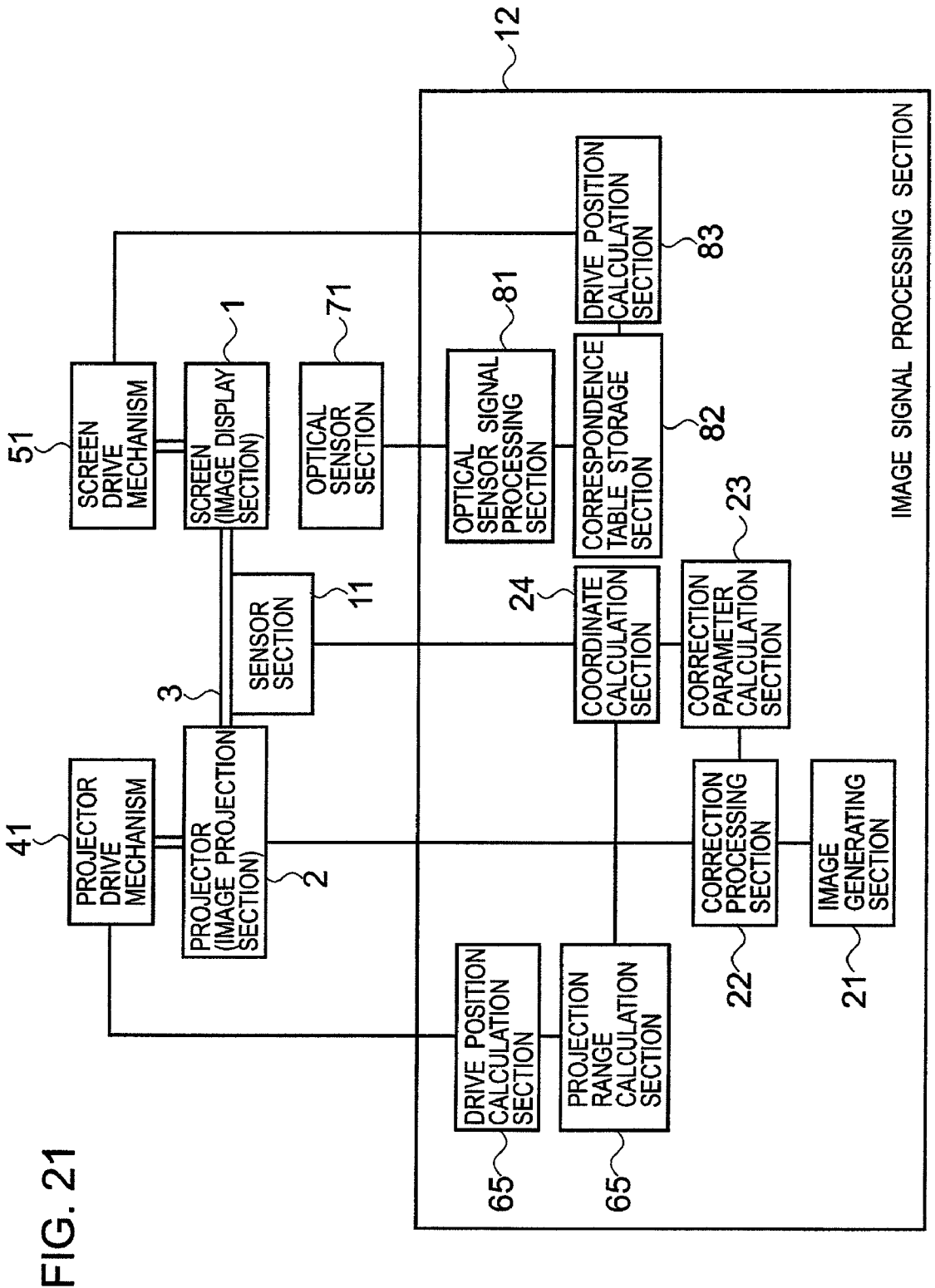
FIG. 21 is a block diagram showing a structure judging the display condition of the screen by means of the optical sensors and moving the screen in the image display apparatus to which the present invention is applied.

Furthermore, in the image display apparatus, the image display condition of the screen 1 may be judged not only by the condition detecting mechanism 52 but also by a plurality of optical sensors 71 detecting the image display condition in the peripheral edge of the screen 1 as shown in FIG. 20. In such an image display apparatus, as shown in FIG. 21, the image signal processing section 12 includes an optical sensor signal processing section 81, which is connected to the optical sensors 71, a correspondence table storage section 82, and a drive position calculation section 83.

The optical sensors 71 are individually provided at peripheral edge portions of the image projection ranges 1-1 to 1-8 as shown in FIG. 18. When there is a shadow in the peripheral edge of the screen 1, the occurrence of the shadow can be detected by any one of the optical sensors 71. When detecting the occurrence of the shadow by the reduced amount of image light detected by any one of the optical sensors 71, the optical sensor signal processing section 81 notifies the drive position calculation section 83 of the image projection area including the shadow. In response to the notification, with reference to the correspondence table of the correspondence table storage section 82, the moving directions and amounts of the position and posture of the screen 1 are calculated for controlling the actuators of the screen drive mechanism 51.

Figure 22:
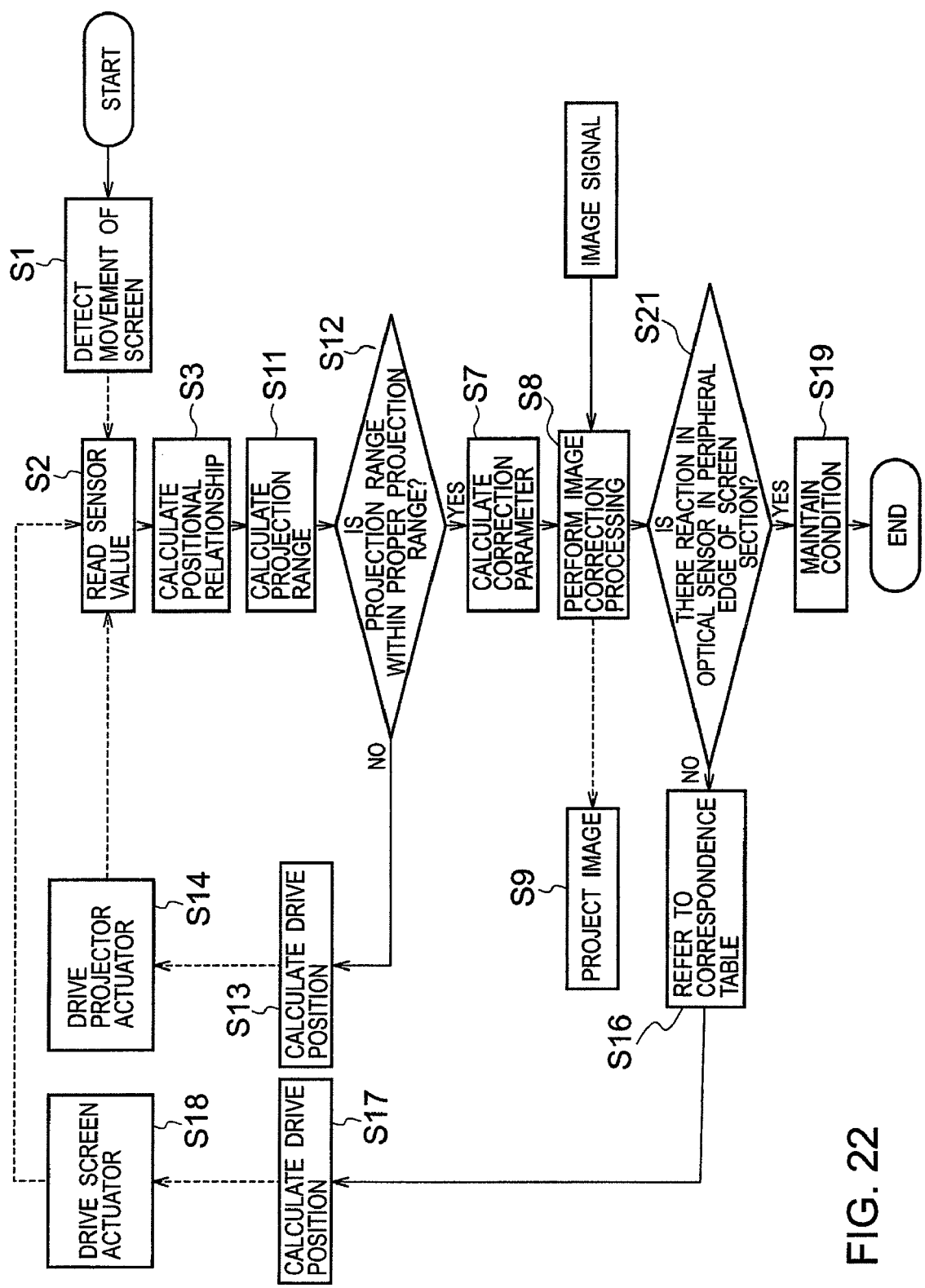
FIG. 22 is a flowchart showing a processing procedure to judge the display condition of the screen by means of the optical sensors and move the screen in the image display apparatus to which the present invention is applied.

In operations of the aforementioned image display apparatus, as shown in FIG. 22, while an image without distortion according to the current relative position and posture between the screen 1 and the projector 2 is being displayed by the operation of the steps S1 to S8, the optical sensor signal processing section 81 judges in the step S21 whether any one of the optical sensors 71, which are placed in the peripheral edge of the screen 1, responds to the occurrence of a shadow because of a small amount of light detected.

When the optical sensor signal processing section 81 judges that any one of the optical sensors 71 has not detected the occurrence of a shadow, the process proceeds to step S19. When any one of the optical sensors 71 has detected the occurrence of a shadow, the process of the steps S16 to S18 is performed to change the position and posture of the screen 1 so that the shadow is not displayed on the screen 1.

Figure 23:
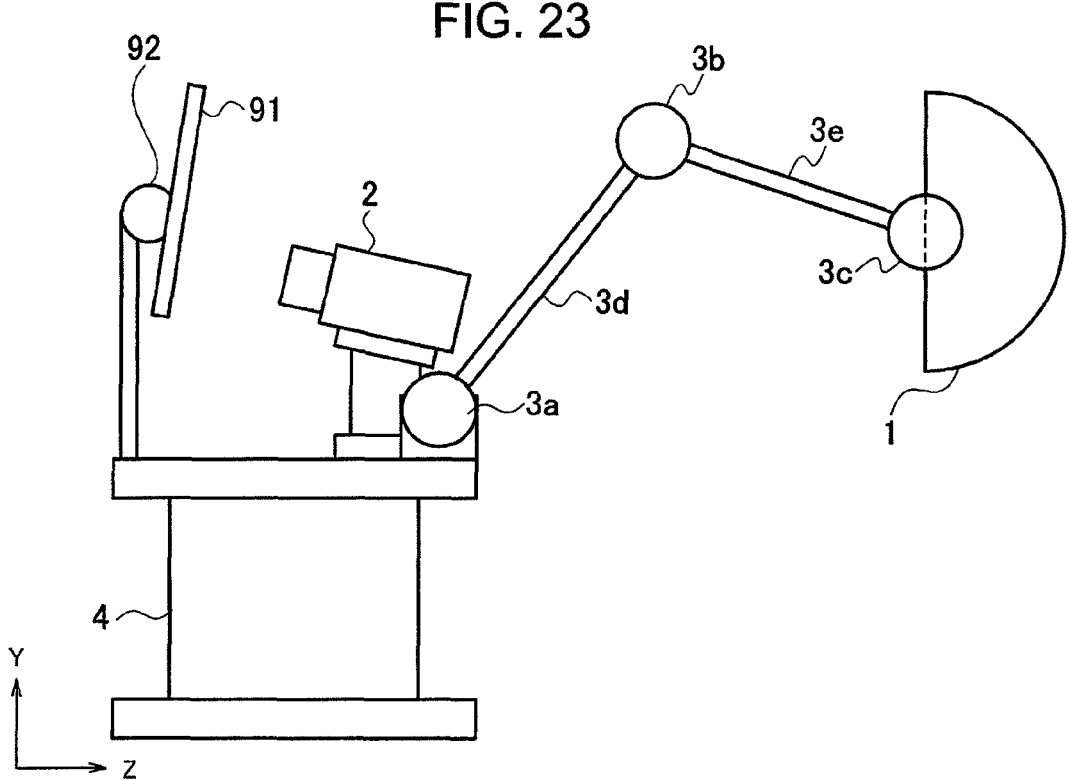
FIG. 23 is a side view showing a structure reflecting image light from the projector on a mirror and projecting the same onto the screen in the image display apparatus to which the present invention is applied.
Figure 24:
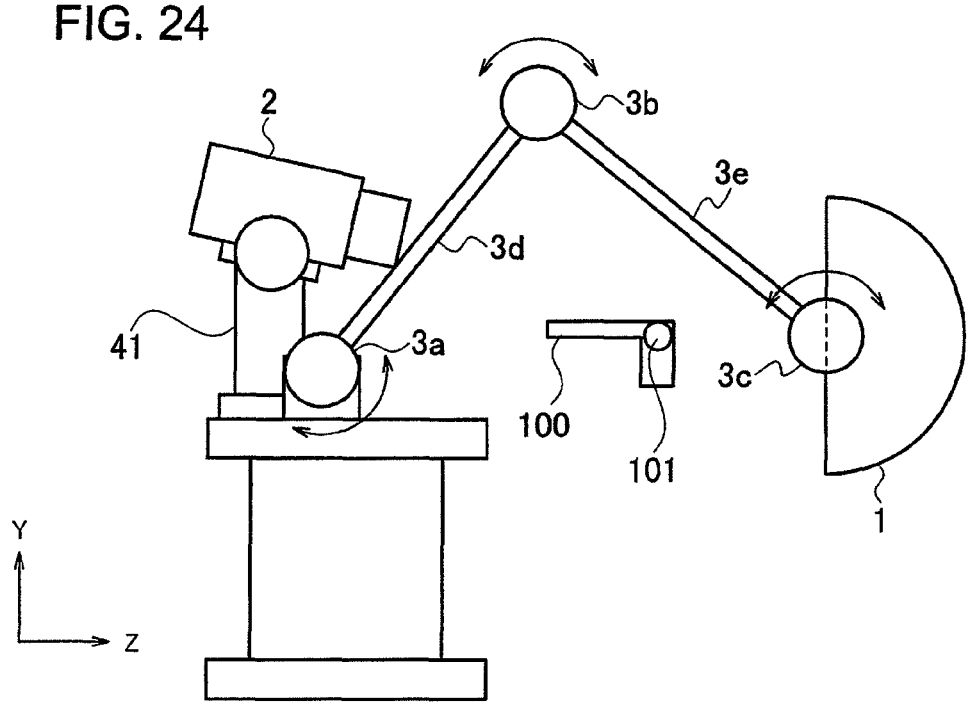
FIG. 24 is a side view showing a structure detecting the viewing point of the viewer and setting a height position of the screen equal to that of the viewing point in the image display apparatus to which the present invention is applied.

Next, in the image display apparatus which the present invention is applied to, a description is given of a structure capable of providing an arbitrary projection range of image light by reflecting the image light from the projector 2 on a mirror with reference to FIG. 23.

In this image display apparatus, the optical axis of the projector 2 is directed opposite to the screen 1, and the image light projected from the projector 2 is reflected on a mirror 91 to be projected onto the screen 1. In this mirror 91, a rotary actuator 92, which allows reflection angle of the image light to vary according to the control signal from the image signal processing section 12, is provided.

In the thus-structured image display apparatus, an image light projecting position, the optical axis, and the angle of field of the projector 2 are previously set. The image signal processing section 12 calculates the current position and posture of the screen 1 to calculate the position and posture at the center position of the screen 1 relative to the posture (rotation angle) of the mirror 91. The image signal processing section 12 then calculates the rotation angle of the mirror 91 which allows image light reflected on the mirror 91 to be projected onto the entire surface of the screen 1 for control of the rotary actuator 92.

The image signal processing section 12 calculates the relative position and posture between the screen 1 and the mirror 91 so that the image light reflected on the mirror 91 is displayed on the entire surface of the screen 1 without distortion to create the correction parameters and perform the distortion correction processing.

With the thus-structured image display apparatus, it is possible to display an image without distortion even when the projector drive mechanism 41, which changes the position and posture of the projector 2, is not provided and the screen 1 is located at arbitrary position and posture. Moreover, it is possible to increase the flexibility in the position where the projector 2 is placed.

Next, in the image display apparatus to which the present invention is applied, a description is given of a structure measuring the position of the viewer seeing an image.

In the previously described image display apparatus, the viewer's viewing position is previously set for calculation of the correction parameters used in the distortion correction processing. However, with this image display apparatus, a position sensor 101 is attached to glasses 100 worn by the viewer to detect the position of the viewer with the image signal processing section 12. For such a function to detect the viewer's viewing position, the position sensor 101 is a magnetic sensor.

In such an image display apparatus, the position of the position sensor 101 is detected every predetermined period of time, and the height position of the screen 1 is controlled so as to be equal to that of the viewer's viewing position. In this case, in response to the change in the relative position and posture between the screen 1 and the projector 2 which is made by changing the height position of the screen 1 by the rotary actuators of the link mechanisms 3*a* to 3*c*, the position and posture of the projector 2 are updated, thus always displaying an image without distortion on the entire surface of the screen 1. Moreover, with the image display apparatus, the position of the screen 1 can be controlled so as to have a same height as the viewer's viewing position, so that the screen 1 is set to a position where display of the screen 1 is easily viewable. Moreover, the screen 1 can be directly faced to the viewer.

Figure 25:
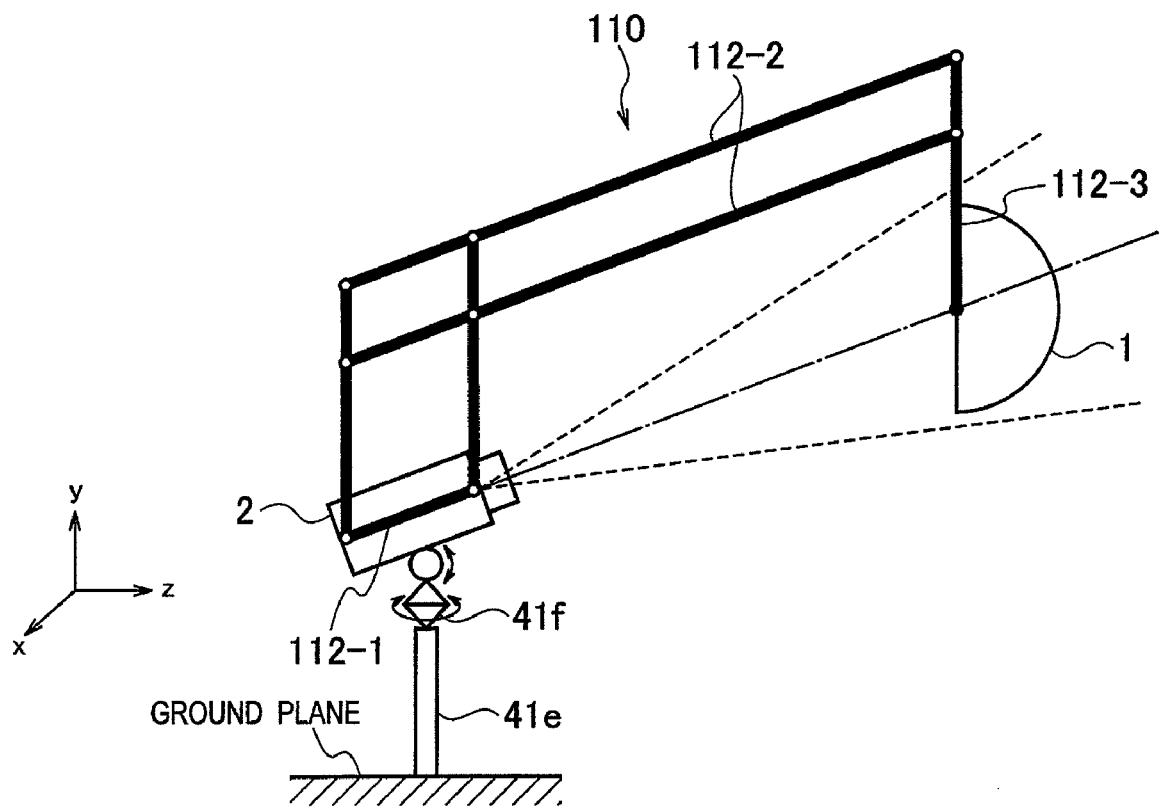
FIG. 25 is a side view showing a structure including a connection mechanism configured to direct the optical axis of the image light to a predetermined position of the screen in the image display apparatus to which the present invention is applied.

Next, a description is given of an image display apparatus to which the present invention is applied, the image display apparatus including a connection mechanism 110, which connects the projector 2 and the screen 1 as shown in FIG. 25, instead of the previously described connection mechanism 3.

Figure 26:
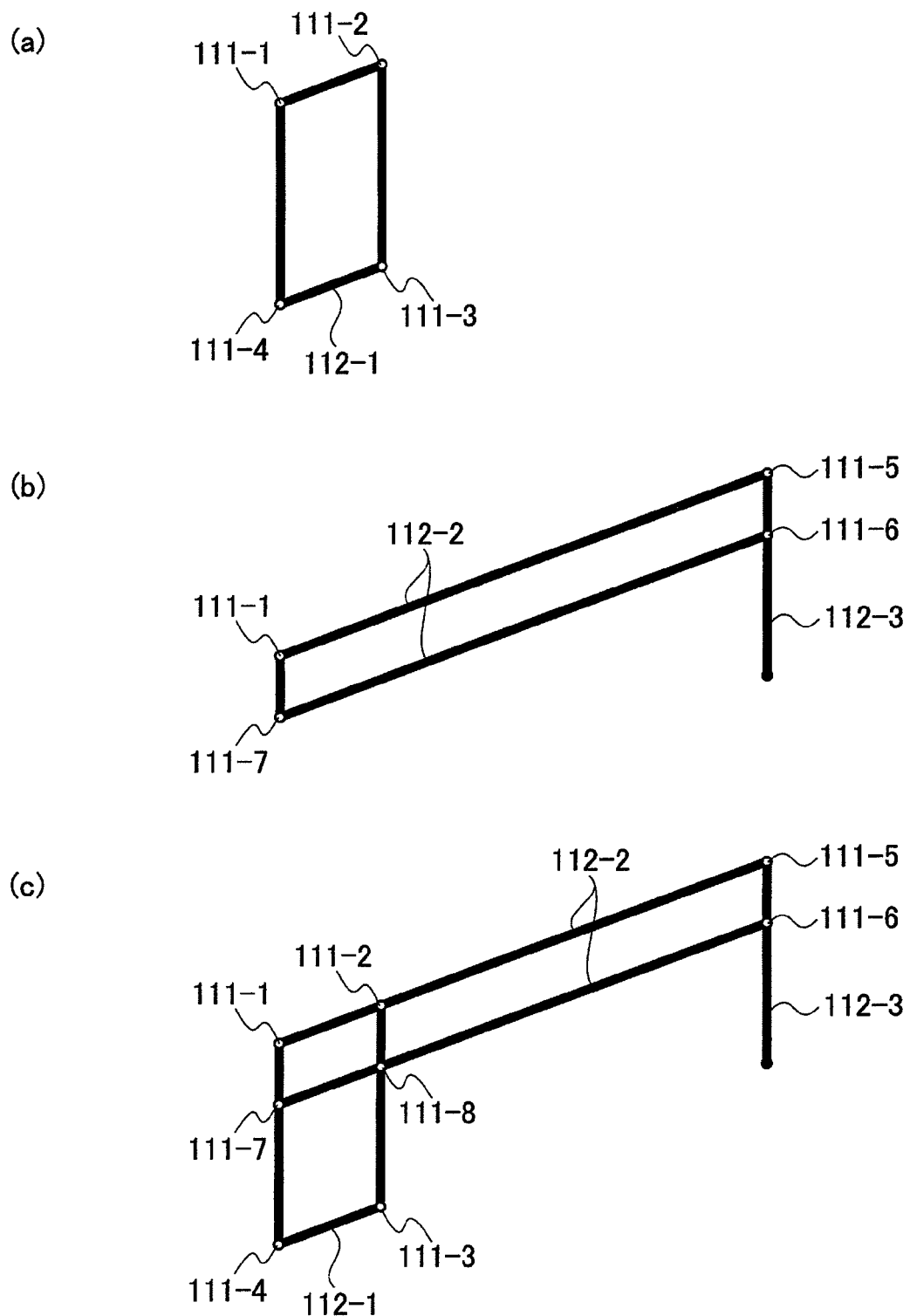
FIG. 26 is an explanatory view showing a structure of the connection mechanism configured to direct the optical axis of the image light to the predetermined position of the screen.

The connection mechanism 110 is composed as shown in FIG. 26(*c*) of a parallel link mechanism shown in FIG. 26(*a*) and a parallel link mechanism shown in FIG. 26(*b*) joined to each other. The parallel link mechanism shown in FIG. 26(a) includes arm joint points 111-1, 111-2, 111-3, and 111-4 and connects arms on four sides with rotary link mechanisms. The parallel link mechanism shown in FIG. 26(b) includes the arm joint points 111-1 and arm joint points 111-5, 111-6, and 111-7 and connects arms on four sides with rotary link mechanisms. The arm joint points 111-1 to 111-8 of the parallel link mechanism shown in FIG. 26(c) are individually composed of rotary link mechanisms rotatable in the vertical direction (in the Y-axis direction) in the drawing.

In the following description, the arm joint points 111-1 to 111-8 of the connection mechanism 110 shown in FIG. 26(c) are collectively referred to just as "arm joint points 111".

Each of the parallel link mechanisms shown in FIGS. 26(a) and 26(b) is composed of two pairs of parallel arms coupled to each other with the four rotary link mechanisms.

The parallel link mechanism shown in FIG. 26(a) includes an arm 112-1 (a first arm), which is fixed to the projector 2 in parallel to the optical axis of the projector 2 and arms (second arms) which are connected to the arm 112-1 at different positions in the optical axis direction and always vertical to the ground plane where the connection link 41e is provided. The parallel link mechanism shown in FIG. 26(b) includes two arms 112-2 (third arms) of same length, which are connected to the second arms at different positions in the vertical direction and always parallel to the optical axis of image light (always parallel to the arm 112-1) and arms always vertical to the ground plane. Ends of the arms 112-2 on the screen 1 side are connected to an arm 112-3 (a fourth arm), which constitutes a part of the peripheral edge of the screen 1 and is connected to the center position of the screen 1 in the up-and-down direction. The arm joint points 111-5 and 111-6 between the arms 112-2 and arm 112-3 incorporate rotary link mechanisms, and the arm 112-3 is always vertical to the ground plane.

Any one of the arm joint points 111 incorporates a rotary actuator rotating the rotary link mechanisms of all the arm joint points 111 in direction vertical to up-and-down direction and optical axis of the projector 2. The arm joint point 111 incorporating the rotary actuator is any one of the arm joint points 111-1 to 111-8. When one of the arm joint points 111 is driven and rotated by the rotary actuator, the rotary link mechanisms of the other arm joint points are driven and rotated in conjunction with each other by the same rotation amount as that of the rotary actuator.

A desired place where the rotary actuator is provided is the arm joint point 111-3 or 111-4 in FIG. 26(c). The reason for that is because a weight member like the rotary actuator can make the weight of the entire connection mechanism smaller when being located at a portion connected to the projector 2 than when being located at the tip of an arm.

Furthermore, the angle sensor acquiring angle information for measuring the relative position and posture between the screen 1 and the projector 2 is provided for at least one of the arm joint points 111. Based on the angle information obtained by this angle sensor, the image signal processing section 12 calculates the relative position and posture between the screen 1 and the projector 2 and corrects image light projected from the projector 2 according to the calculated relative position and posture.

Figure 28:
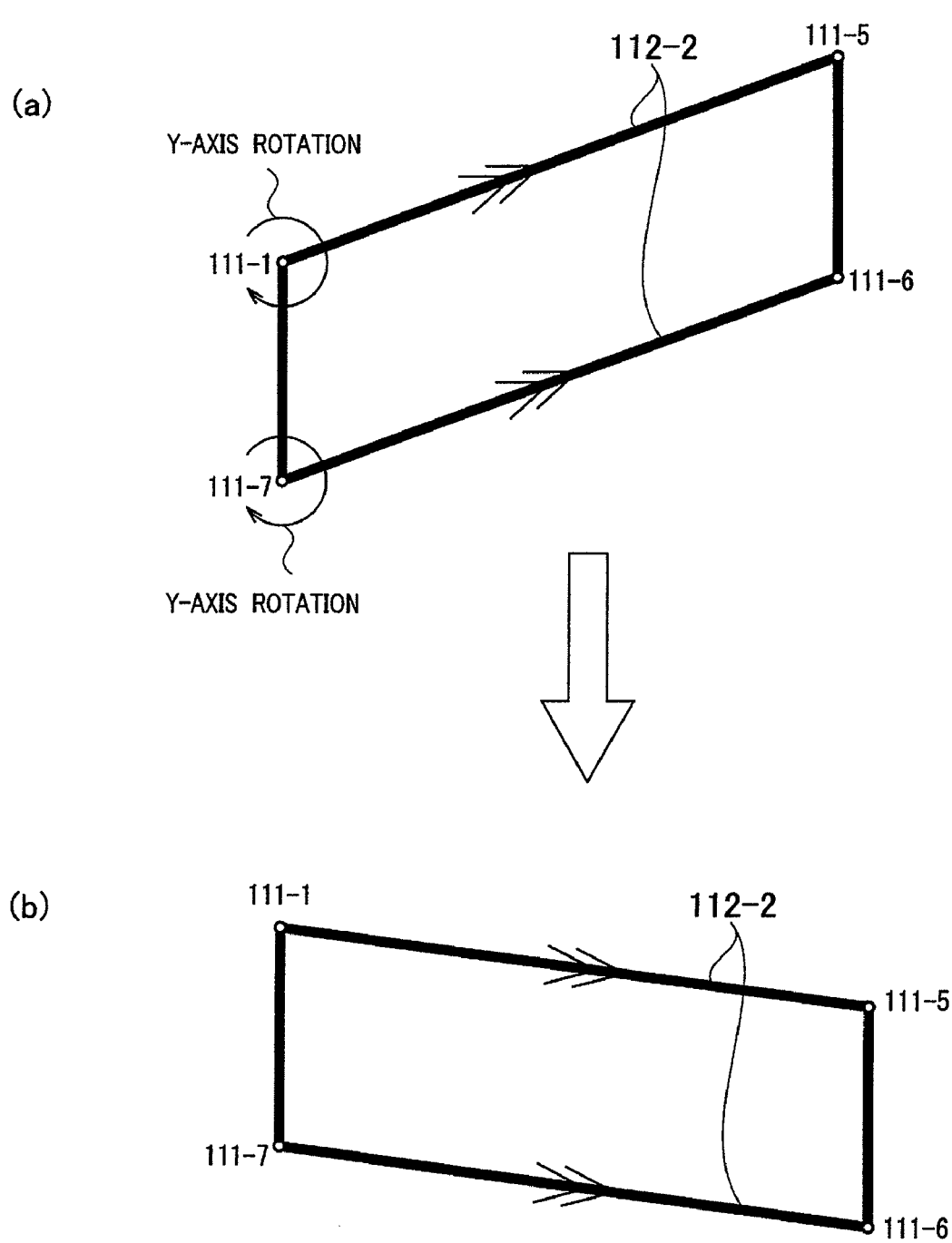
FIG. 28 is another explanatory view showing the state variation of the connection mechanism configured to direct the optical axis of the image light to the predetermined position of the screen.

As shown in FIG. 25, in the thus-structured connection mechanism 110, the arm 112-1 parallel to the optical axis of image light projected from the projector 2 is coupled to the projector 2. The rotary link mechanisms at both ends of the arm 112-1 and the other rotary link mechanisms are therefore rotated when the projector 2 is driven by the projector drive mechanism 41 in the pan and tilt directions. For example, when the projector 2 is driven by the projector drive mechanism 41 of the projector 2 so as to direct image light upward in a state shown in FIG. 27(a), as shown in FIG. 27(b), all the rotary link mechanisms are rotated to keep the arm 112-1 and the arms 112-2 in parallel. As shown in FIG. 28, when the arm joint points 111-1 and 111-7 are rotated to drive the connection mechanism 110 from the state of (a) to the state of (b), the arms 112-2 are always parallel to each other.

At this time, in the connection mechanism 110, the sum of angles theta 1 and theta 2 at the arm joint points 111 is always 180 degrees. Accordingly, the arms 112-1 and 112-2 are always parallel to the optical axis of image light of the projector 2 independent of the relative position and posture between the screen 1 and the projector 2, so that the optical axis of image light of the projector 2 can be always directed to the center position of the screen 1.

Figure 29:
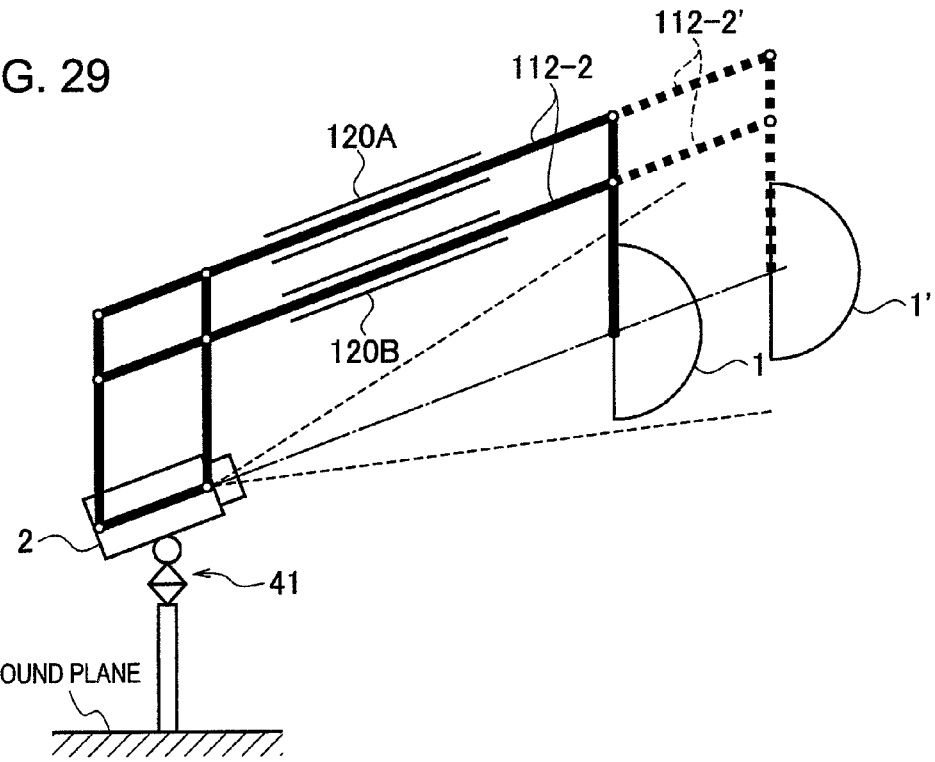
FIG. 29 is a side view of a structure including an extension mechanism to extend and reduce a distance between the screen and the projector with the optical axis of the image light being directed to the predetermined position of the screen in the image display apparatus to which the present invention is applied.

The image display apparatus including the aforementioned connection mechanism 110 may include extension mechanisms 120A and 120B which extend and reduce length of the arms 122-2 as shown in FIG. 29. The extension mechanisms 120A and 120B are manually or automatically extended or contracted to change the distance between the screen 1 and the projector 2. In case of the length of the arms 112-2 is configured to be automatically changed, the extension mechanisms 120A and 120B need to include linear actuators. When the extension mechanisms 120A and 120B are manually or automatically extended and contracted to move the screen 1 at a predetermined position to the position indicated by a screen 1', which is farther from the projector 2 than the predetermined position, the image signal processing section 12 performs distortion correction for image light projected from the projector 2 according to the change in the relative distance between the screen 1 and the projector 2.

This allows the image display apparatus to always direct the optical axis of light image of the projector 2 to the screen 1 and increase the flexibility in positions of the screen 1 and the projector 2 in the longitudinal direction.

Figure 30:
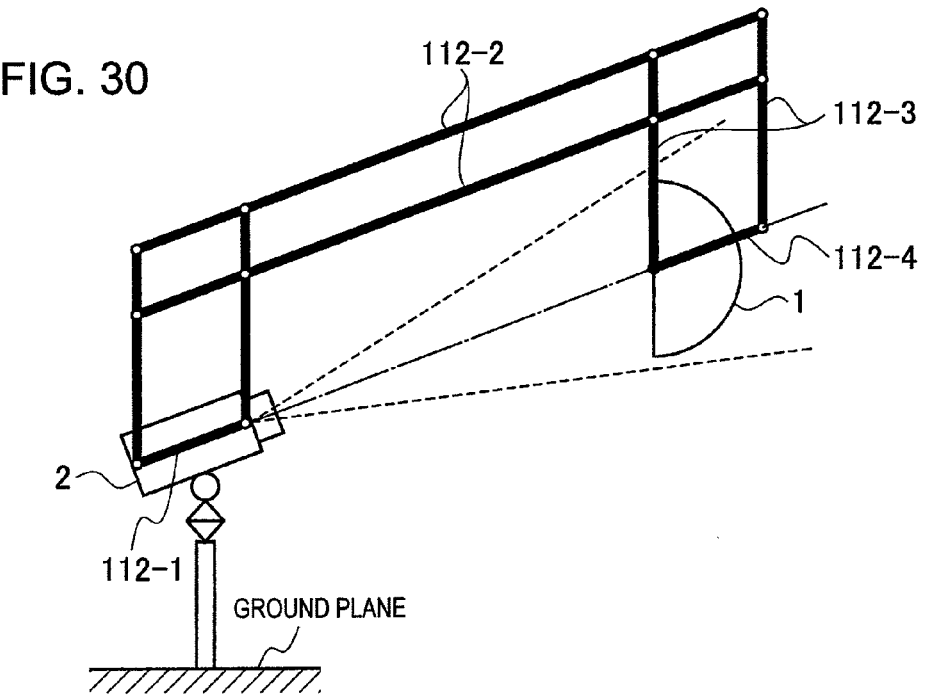
FIG. 30 is a side view showing a structure including a connection mechanism configured to keep constant a posture of a projection plane of the screen in the image display apparatus to which the present invention is applied.

Furthermore, as shown in FIG. 30, the image display apparatus including the connection mechanism 110 may include a function to always maintain the projection plane of the screen 1 at a certain angle with respect to the projector 2. This function is implemented by an arm 112-4 (fifth arm), which is always parallel to the arms 112-1 and 112-2 and parallel to the optical axis of image light projected from the projector 2. One end of the arm 112-4 is connected to the center position of the screen 1 in the up-and-down direction in the peripheral edge of the screen 1, and both ends of the arm 112-4 are connected to two arms 112-3 of same length, which are individually connected to the two arms 112-2. The arm joint points 111 connecting the arms 112-3 and the arm 112-4 incorporate rotary link mechanisms.

Figure 31:
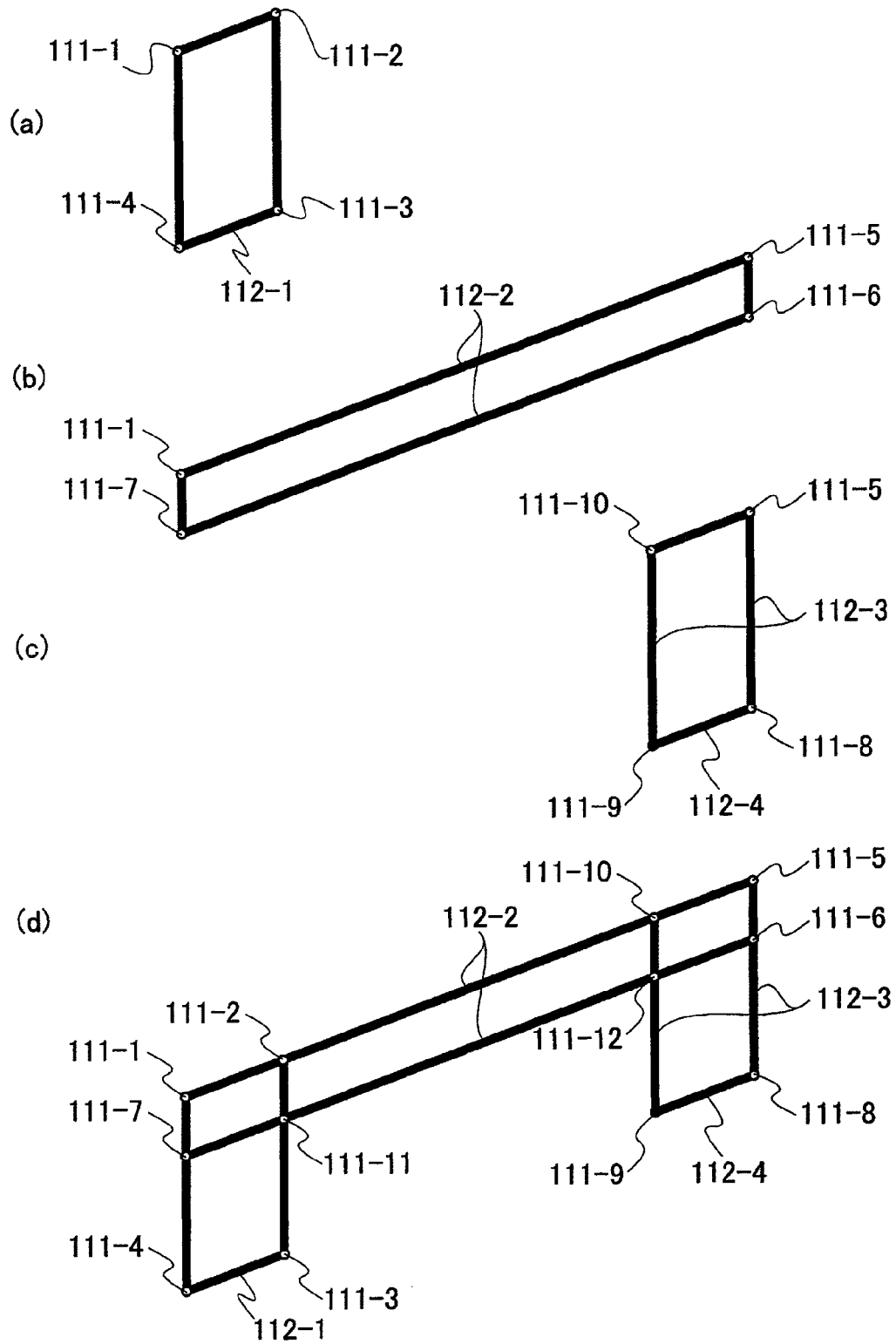
FIG. 31 is an explanatory view showing a structure of the connection mechanism configured to keep constant the posture of the projection plane of the screen.

As shown in FIG. 31, the connection mechanism 110 is composed as shown in (d) of a parallel link mechanism of (a), a parallel link mechanism of (b), and a parallel link mechanism (c), which are coupled to each other. The parallel link mechanism of (c) includes arm joint points 111-10, 111-5, 111-8, and 111-9 and arms on four sides connected by rotary link mechanisms. The arm joint point 111-5 of the parallel link mechanism of (b) and the arm joint point 111-5 of the parallel link mechanism of (c) are laid on each other.

This allows the image display apparatus to always direct the projection plane of the screen 1 toward the projector 2 at a certain angle. It is therefore possible to always display an image without distortion without the need to perform the processing to change the distortion correction parameters for distortion correction of image light in the steps S1 to S7 of FIG. 10 even when the projector 2 is driven by the projector drive mechanism 41.

Furthermore, as shown in FIG. 32, the image display apparatus including the connection mechanism 110 may include a function to freely rotate the projection plane of the screen 1 around the center position of the projection plane in arbitrary directions orthogonal to each other at the center point of the projection plane.

This connection mechanism 110 includes a rotation mechanism 114, which rotates around the arm 112-3, at the tip of the arm 112-3, which is connected to the ends of the arms 112-2 on the screen 1 side and is vertical to the ground plane. This rotation mechanism 114 is connected to an arm 113, which is connected to both ends of the screen 1 in the horizontal direction from the center point thereof in the peripheral edge of the screen 1. The rotation mechanism 114 is automatically and manually rotated. If the rotation mechanism 114 is configured to automatically rotate, the rotation mechanism 114 incorporates a rotary actuator. When the rotation mechanism 114 is driven, therefore, the projection plane of the screen 1 is rotated by the arm 113 in the horizontal direction around the center point of the projection plane in the up-and-down direction. Moreover, the connection mechanism 110 includes a rotation mechanism 115, which rotates the arm 112-3 and a direction vertical to a vertical line of the projection plane of the screen 1, at a connection point of the arm 113 and the screen 1. When this rotation mechanism 115 is manually or automatically rotated, therefore, the projection plane of the screen 1 is rotated around the center point of the projection plane of the screen 1 in horizontal direction in an anteroposterior direction. If the rotation mechanism 115 is configured to automatically rotate, the rotation mechanism 115 incorporates a rotary actuator.

In the case where the thus-structured connection mechanism 110 is provided, when the rotation mechanism 114 or 115 rotates to change the posture of the screen 1 relative to the projector 2, the image signal processing section 12 updates the distortion correction parameters based on the changed posture to cause the projector 2 to project image light without distortion.

With the above image display apparatus, even when the screen 1 rotates in horizontal and anteroposterior direction, the relative position between the center point of the projection plane and the projector 2 is fixed, thus making it possible to always project image light without distortion on the screen 1.

Furthermore, the above image display apparatus including the connection mechanism 110 may include a stopper mechanism fixing the rotary link mechanism as shown in FIG. 33 in any one of the arm joint points 111.

This stopper mechanism includes a rotary section 132, which is provided at an end of an arm 130 constituting the connection mechanism 110, a pressing section 133, and a pressing force generation section 134, which are accommodated in a casing 131 of each arm joint point 111. The pressing force generation section 134 is composed of, for example, a spring mechanism and gives pressing force generated by the spring to the pressing section 133. The pressing section 133 is brought into contact with the rotation section 132 by the pressing force generated by the pressing force generation section 134 to suppress rotation of the rotary section 132.

In the stopper mechanism, to rotate the arm 130 connected to the arm joint point 111, the rotation section 132 is not pressed against the pressing section 133 as shown in FIG. 34(a). To bring the arm 130 into a lock state in which rotation thereof is prevented, as shown in FIG. 34(b), the pressing force generated by the pressing force generation section 134 is given to the pressing section 133, and the rotary section 132 is pressed by the pressing section 133 so as not to rotate.

With the above image display apparatus, the arm joint points 111 can be stably fixed by the stopper mechanisms without the rotary actuators in the arm joint points 111 even when the connection mechanism 110 is manually operated to change the relative position and posture between the screen 1 and the projector 2.

Figure 35:
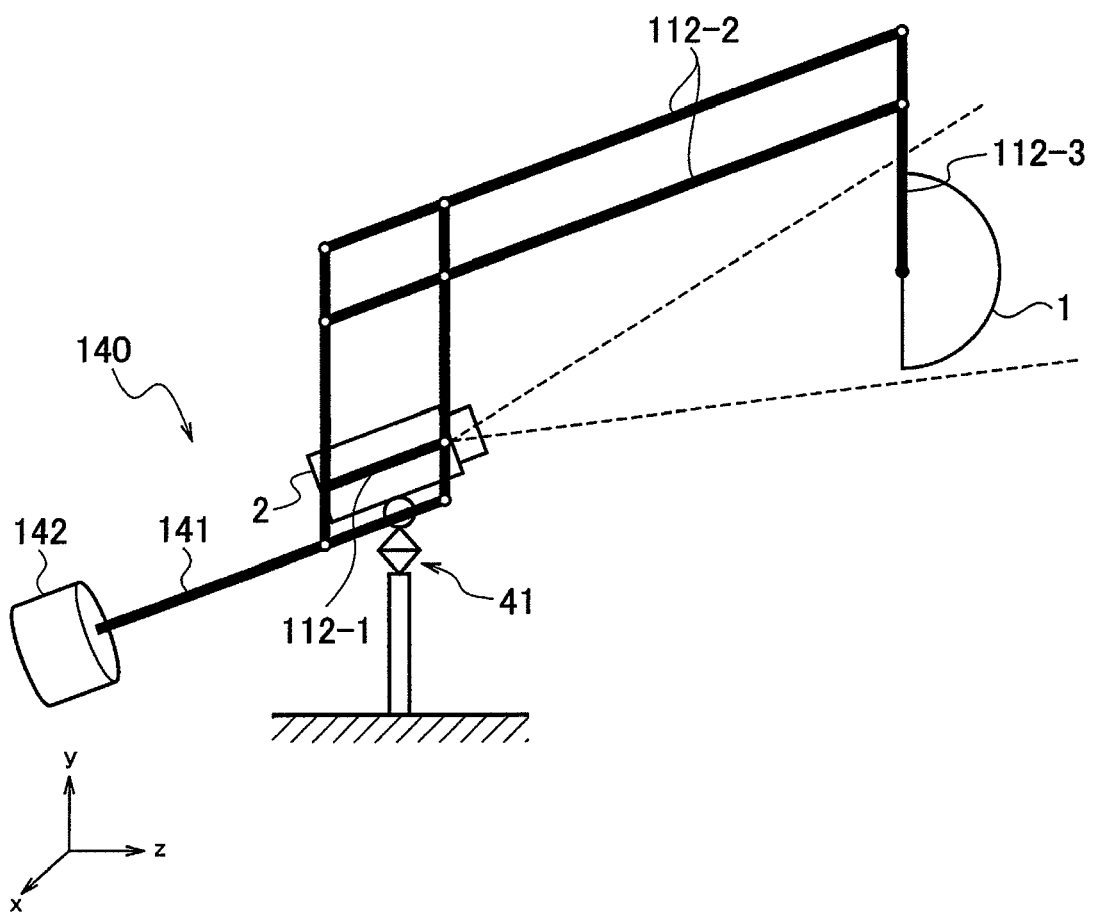
FIG. 35 is a side view showing a structure including a connection mechanism provided with a counterbalance section in the image display apparatus to which the present invention is applied.

Still furthermore, as shown in FIG. 35, the image display apparatus including the connection mechanism 110 may include a function in the projector 2 to compensate weight of the screen 1.

This function is implemented by a counterbalance section 140, which includes an arm 141 and a weight section 142. The arm 141 is connected to places on extensions of arms on the ground plane side, the arms being connected to the both ends of the arm 112-1 and vertical to the ground plane. The weight section 142 is attached to the tip of the arm 141. The arm 141 is parallel to the arms 112-1 and 112-2. The weight of the weight section 142 is set depending on the desired position of the screen 1 relative to the projector 2. The weight of the weight section 142 can be arbitrarily varied.

The counterbalance section 140 gives the projector 2 a force holding the posture of the projector 2 at a predetermined posture by a weight member with the center point of the projector 2 in an anteroposterior direction being set as a point of support.

With the image display apparatus including the counterbalance section 140, it is possible to reduce force necessary for an operator to move the screen 1 in the vertical direction (Y-axis direction) and improve the operability. Furthermore, to drive the screen 1 with the actuators requires less drive force than that in the structure not including the counterbalance section 140.

The aforementioned embodiments are just examples of the present invention. Accordingly, the present invention is not limited to the aforementioned embodiments, and it is obvious that various changes can be made according to the design and the like without departing from the scope of the technical idea according to the present invention in addition to the embodiments.

For example, in the above description, the type of an image projected from the projector 2 onto the screen 1 is not specified. However, in a state where the image display apparatus is placed in an operation room and an endoscopic camera is directly inserted in a diseased organ in an endoscopic operation, visual information (an image signal) obtained from the endoscopic camera is inputted into the image generating section 21 of the image signal processing section 12 and projected from the projector 2 onto the screen 1, making it possible to provide an immersive image to an operator.

Moreover, as well as the image signal obtained by the endoscopic camera is projected from the projector 2 onto the screen 1, information from various types of measuring equipment (a sphygmomanometer and a pulse rate meter) which are set in the operation room and measure conditions of a subject may be projected onto the screen 1. In this case, character information indicating numerical values measured by the sphygmomanometer and pulse rate meter is superimposed on the image signal generating by the image generating section 21 and subjected to the image distortion correction processing by the correction processing section 22, and then image light is projected from the projector 2. With this image display apparatus, it is therefore possible to implement an operation room in which operation conditions can be presented to the operator by creating by the image generating section 21 an image signal for presenting operation conditions which includes a signal of the image captured by the endoscopic camera and biologic information (blood pressure, pulse rate, and the like) of the subject and projecting the same from the projector 2 onto the screen 1.

In such an operation room, it is possible to progress an operation while showing an image obtained from the endoscopic camera to the operator in real time and simultaneously showing the updated biological information of the subject in real time to the operator. Therefore, the image from the endoscopic camera and the biological information can be viewed from the same point of view. Moreover, by giving a role as a navigator of an operation to the image display apparatus, it is possible to provide an operation room in which an operation can be performed properly and quickly.

Furthermore, the image display apparatus may constitute a simulator performing a virtual operation simulation in cooperation with an operation simulation program by, for example, displaying an image of the subject on the screen 1 by computer graphics or the like and displaying the progress of the operation on the screen 1 by computer graphics according to motion of operator's hands based on sensor signals obtained from gloves with sensors worn by the operator. In this case, the image generating section 21 generates the CG image of a surgery site according to the sensor signals of the gloves with sensors. With such an operation simulator, since the image displayed on the screen 1 is an image without distortion, the viewer (operator) can be immersed into a simulation world as virtual reality without feeling strange about the image.

INDUSTRIAL APPLICABILITY

The present invention provides a realistic image space to a viewer and is available to purposes of projecting an image on a screen to create feeling of realizing the image.

The invention claimed is:

1. An image display apparatus, comprising:
an image projector receiving an image signal and projecting image light;
an image display including a projection plane of an arbitrary shape, onto which the image light from the image projector is projected;
a connector including a plurality of arms which connect the image projector and the image display and a link mechanism which allows a relative position and posture between the image projector and the image display to one of manually and automatically change;
a measurer that measures the relative position and posture between the image projector and the image display; and
an image signal processor which calculates correction parameters for correction of distortion of the image light projected from the image projector onto the image display, wherein the correction parameters are calculated based on the relative position and posture measured by the measurer, the correction parameters are calculated further based on a previously set viewing position of a viewer, the correction parameters are calculated further based on the shape of the projection plane of the image display, the correction parameters are calculated further based on an angle of field of the image light projected from the image projector, and the correction parameters are calculated further based on a shift amount which is a distance between a point where a virtual projection plane intersects a previously set optical axis of the image projector and a center point of projected image on the virtual projection plane, and the image signal processor performs a distortion correction processing for the image signal inputted into the image projector based on the calculated correction parameters.

2. The image display apparatus according to claim 1, wherein
the connector changes an image light projection direction of the image projector to match an optical axis of the image light projected from the image projector with a predetermined position of the projection plane of the image display,
the measurer measures the position and posture of the image display unit relative to the position and posture of the image projector in response to the change of the image light projection direction of the image projector by the connector, and
in response to a measurement of a new relative position and posture by the measurer, the image signal processor updates the correction parameters based on the new relative position and posture.

3. The image display apparatus according to claim 1, further comprising:
a display condition judger which detects an image projection range of the image display and judges whether the image light is projected onto the entire image display, wherein
when it is judged by the display condition judger that an image is not projected onto the entire image display, the connector changes the relative position and posture between the image display and the image projector to allow the image light to be projected onto the entire image display; and
the image signal processor updates the correction parameters according to the changed relative position and posture between the image projector and the image display.

4. The image display apparatus according to claim 1, further comprising:
a display condition judger which detects an image display condition in an edge portion of the image display and judges whether the image light is projected onto the entire image display, wherein
when it is judged by the display condition judger that an image is not projected onto the entire image display, the connector changes the relative position and posture between the image display and the image projector to allow the image light to be projected onto the entire image display; and
the image signal processor updates the correction parameters according to the changed relative position and posture between the image projector and the image display.

5. The image display apparatus according to claim 1, wherein
a mirror capable of changing a reflection direction of the image light is provided between the image projector and the image display, and the image light of the image projector is projected onto the image display through the mirror.

6. The image display apparatus according to claim 1, further comprising:
a viewing position measurer that measures the viewing position of the viewer, wherein
the connector controls a height of the image display to match a height of the viewing position measured by the viewing position measurer, and
the image signal processor updates the correction parameters according to a variation of the height of the image display.

7. The image display apparatus according to claim 1, further comprising:
an instruction input which detects one of a speech and an operation of the viewer and inputs an instruction to change the position and posture of the image display unit based on the detected one of the speech and the operation, wherein
the connector changes the position and posture of the image display according to the instruction inputted by the instruction input, and
the image signal processor updates the correction parameters according to the changed position and posture of the image display.

8. The image display apparatus according to claim 7, wherein
the instruction input detects one of a speech and an operation of the viewer and inputs an instruction to fix the position and posture of the image display based on one of the speech and the operation, and
the connector fixes the position and posture of the image display according to the instruction inputted by the instruction input.

9. The image display apparatus according to claim 1, wherein
the connector includes:
a first arm which is placed in parallel to the optical axis of the image light projected from the image projector and fixed to the image projector;
a plurality of second arms which are connected to different positions of the first arm in the optical axis direction and are vertically linked to a ground plane;
a plurality of third arms which are connected to different positions of each second arm, in the plurality of second arms, in the vertical direction and are parallel to the optical axis of the image light; and
a fourth arm vertically linked to the ground plane from the plurality of third arms and connected to the image display, and
connection points of the first arm and the plurality of second arms, connection points of the plurality of second arms and the plurality of third arms, and connection points of the plurality of third arms and the fourth arm freely rotate to allow the optical axis of the image light projected from the image projector to be projected onto an arbitrary position of the projection plane of the image display.

10. The image display apparatus according to claim 9, wherein
the connector includes an extension mechanism which changes a length of the plurality of second arms and the extension mechanism is one of automatically and manually one of extended and contracted to change a distance between the display projector and the image display.

11. The image display apparatus according to claim 9, comprising:
a fifth arm which fixes the projection plane of the image display at a predetermined angle of the projection plane with respect to the image projector and is connected to the image display in parallel to the optical axis of the image light.

12. The image display apparatus according to claim 9, wherein
the fourth arm includes a rotation mechanism allowing the posture of the projection planar relative to the image projector to freely rotate around a predetermined position of the projection plane.

13. The image display apparatus according to claim 9, wherein
any one of the connection points of the first arm and the plurality of second arms, the plurality of second arms and the plurality of third arms, and the plurality of third arms and the fourth arm includes a stopper mechanism fixing rotation of the connection point to allow the optical axis of the image light projected from the image projector to be projected onto an arbitrary position of the projection plane of the image display.

14. The image display apparatus according to claim 9, comprising:
a counter weight generating force holding the posture of the image projector at a predetermined posture to hold the position of the image display relative to the image projector at a predetermined position.

15. The image display apparatus according to claim 1, wherein
the image projector projects image light rays with a parallax therebetween from at least one of a plurality of image light projecting sections to cause the image display to display a stereoscopic image.

16. The image display apparatus according to claim 1, comprising:
a point-of-view monitor which monitors the viewing position of the viewer and detects that the monitored viewing position is deviated from a previously set viewing position; and
an informer that informs if the point-of-view monitor detects that the monitored viewing position is deviated from the previously set viewing position.

17. The image display apparatus according to claim 16, wherein
the informer is a sound output outputting sound to the viewer, and
the point-of-view monitor informs that the monitored viewing position is deviated from the previously set viewing position by causing the sound output to output sound.

18. The image display apparatus according to claim 17, wherein
the point-of-view monitor varies a state of the sound outputted from the sound output according to one of an amount and a direction that the monitored viewing position is deviated from the previously set viewing position.

19. The image display apparatus according to claim 16, wherein
the image projector serves as the informer, and the point-of-view monitor informs that the monitored viewing position is deviated from the previously set viewing position by varying a color of the image light projected from the image projector.

20. The image display apparatus according to claim 19, wherein
the point-of-view monitor varies the color of the image light projected from the image projector according to one of an amount and a direction that the monitored viewing position is deviated from the previously set viewing position.

21. The image display apparatus according to claim 16, wherein
the informer is a light emitter emitting light to the viewer, and
the point-of-view monitor informs that the monitored viewing position is deviated from the previously set viewing position by causing the light emitter to emit light.

22. The image display apparatus according to claim 21, wherein
the point-of-view monitor varies the light emitted by the light emitter according to one of an amount and a direction that the monitored viewing position is deviated from the previously set viewing position.

23. An image distortion correction method for an image display apparatus, including:
an image projector receiving an image signal and projecting image light; an image display including a projection plane of arbitrary shape, onto which the image light from the image projector is projected; a connector including a plurality of arms which connect the image projector and the image display and a link mechanism which allows a relative position and posture between the image projector and the image display to one of manually and automatically change; and a measurer measuring that measures the relative position and posture between the image projector and the image display, the image distortion correction method comprising:
calculating correction parameters for correcting a distortion of the image light projected from the image projector onto the image display, wherein the correction parameters are calculated based on the relative position and posture measured by the measurer, the correction parameters are calculated further based on a previously set viewing position of the viewer, the correction parameters are calculated further based on the shape of the projection plane of the image display, the correction parameters are calculated further based on an angle of a field of the image light projected from the image projector, and the correction parameters are calculated further based on a shift amount which is a distance between a point where a virtual projection plane intersects a previously set optical axis of the image projector and a center point of a projected image on the virtual projection plane; and
performing a distortion correction processing for the image signal inputted into the image projector based on the correction parameters.

* * * * *